United States Patent
Ou et al.

(10) Patent No.: US 12,533,084 B2
(45) Date of Patent: Jan. 27, 2026

(54) SYSTEMS AND METHODS FOR BACKGROUND SIGNAL REDUCTION IN BIOSENSORS

(71) Applicant: ABBOTT DIABETES CARE INC., Alameda, CA (US)

(72) Inventors: Junli Ou, Pleasanton, CA (US); Hyun Cho, Berkeley, CA (US); Ting Chen, Alameda, CA (US); Erwin S. Budiman, Fremont, CA (US); Stephen Oja, Oakland, CA (US); Kuan-Chou Chen, Fremont, CA (US)

(73) Assignee: Abbott Diabetes Care Inc., Alameda, CA (US)

( * ) Notice: Subject to any disclaimer, the term of this patent is extended or adjusted under 35 U.S.C. 154(b) by 1049 days.

(21) Appl. No.: 17/370,860

(22) Filed: Jul. 8, 2021

(65) Prior Publication Data
US 2022/0008017 A1 Jan. 13, 2022

Related U.S. Application Data

(60) Provisional application No. 63/050,532, filed on Jul. 10, 2020.

(51) Int. Cl.
*A61B 5/00* (2006.01)
*A61B 5/145* (2006.01)
(Continued)

(52) U.S. Cl.
CPC .......... *A61B 5/7203* (2013.01); *A61B 5/1451* (2013.01); *A61B 5/14865* (2013.01);
(Continued)

(58) Field of Classification Search
CPC .............. A61B 5/1451; A61B 5/14532; A61B 5/1473–1477; A61B 5/1486–14865;
(Continued)

(56) References Cited

U.S. PATENT DOCUMENTS

| 2003/0050541 | A1* | 3/2003 | Wuori | A61B 5/14532 600/316 |
| 2007/0142720 | A1* | 6/2007 | Ridder | A61B 5/14532 600/336 |

(Continued)

FOREIGN PATENT DOCUMENTS

| WO | WO-2007126920 A1 * | 11/2007 | ......... A61B 5/14532 |

OTHER PUBLICATIONS

International Search Report and Written Opinion for International Application No. PCT/US2021/040933, dated Dec. 14, 2021, 13 pages.

(Continued)

*Primary Examiner* — Tse W Chen
*Assistant Examiner* — Alice Ling Zou
(74) *Attorney, Agent, or Firm* — Workman Nydegger

(57) ABSTRACT

A method of operating an analyte device includes: receiving an analyte signal measured from an analyte sensor device having a sensor tail; generating adjusted analyte data based on the analyte signal, the generating the adjusted analyte data including reducing a background signal in the analyte signal in accordance with an offset signal; computing an analyte value based on the adjusted analyte data; and displaying the analyte value on a display device.

42 Claims, 19 Drawing Sheets

(51) Int. Cl.
  *A61B 5/1486* (2006.01)
  *A61B 5/1495* (2006.01)

(52) U.S. Cl.
  CPC .......... *A61B 5/1495* (2013.01); *A61B 5/4839* (2013.01); *A61B 5/7221* (2013.01); *A61B 5/14532* (2013.01); *A61B 5/14546* (2013.01); *A61B 2560/0247* (2013.01)

(58) Field of Classification Search
  CPC ... A61B 5/1495; A61B 5/7203; A61B 5/7225; A61B 2560/0223; A61B 5/1468–14735; A61B 5/7221
  See application file for complete search history.

(56) References Cited

U.S. PATENT DOCUMENTS

| | | | |
|---|---|---|---|
| 2008/0034972 A1* | 2/2008 | Gough | A61B 5/14532 210/500.33 |
| 2009/0131769 A1 | 5/2009 | Leach et al. | |
| 2010/0072062 A1* | 3/2010 | Curry | A61B 5/14532 204/415 |
| 2010/0191085 A1 | 7/2010 | Budiman | |
| 2010/0219085 A1* | 9/2010 | Oviatt, Jr. | A61B 5/14865 205/792 |
| 2011/0259741 A1* | 10/2011 | Murase | A61B 5/14865 204/403.01 |
| 2012/0296186 A1* | 11/2012 | Ouyang | A61B 5/14532 600/347 |
| 2014/0005505 A1 | 1/2014 | Peyser et al. | |
| 2015/0216456 A1* | 8/2015 | Budiman | A61B 5/14546 600/309 |
| 2017/0281092 A1 | 10/2017 | Burnette et al. | |
| 2021/0209497 A1* | 7/2021 | Wang | A61B 5/1495 |

OTHER PUBLICATIONS

International Preliminary Report on Patentability received for PCT application No. PCT/US21/40933, mailed on Jan. 19, 2023, 9 pages.
Invitation to Pay Additional Fees received for PCT application No. PCT/US21/40933, mailed on Oct. 21, 2021, 8 pages.

* cited by examiner

SYSTEMS AND METHODS FOR BACKGROUND SIGNAL REDUCTION IN BIOSENSORS

CROSS-REFERENCE TO RELATED APPLICATION(S)

This application claims priority to, and the benefit of, U.S. Provisional Patent Application No. 63/050,532, filed in the United States Patent and Trademark Office on Jul. 10, 2020, the entire disclosure of which is incorporated by reference herein.

FIELD

Aspects of embodiments of the present disclosure relate to systems and methods for background signal reduction in biosensors, such as analyte sensors.

BACKGROUND

Electrochemical biosensors can provide low-cost, rapid assessment tools that can be used to fulfil patients' needs to manage their medical conditions outside of hospital and clinical environments. Some examples of such electrochemical biosensors include implantable analyte sensors that can be used to monitor the levels of various analytes in a patient's body, such as monitoring glucose levels in people with diabetes. Information about the levels of these analytes allows for managed care and control of patient diseases, such as by alerting a person with diabetes when glucose levels are high or low or are trending higher or lower.

Amperometry provides one class of detection scheme for electrochemical biosensors in which an electric signal (e.g., a current) produced under a controlled electric voltage or electrical potential reflects the concentration of an analyte in a solution. The measured electrical signal includes a background signal, which may include noise and interference from a variety of sources, such as the reaction of other substances with the sensor in addition to early sensor attenuation (ESA) and late sensor attenuation (LSA) effects frequently observed in similar electrochemical biosensors.

SUMMARY

Aspects of embodiments of the present disclosure relate to systems and methods for reducing a background signal or background signals in an analyte signal measured by a biosensor.

According to one embodiment of the present disclosure, a method of operating an analyte device includes: receiving an analyte signal measured from an analyte sensor device having a sensor tail; generating adjusted analyte data based on the analyte signal, the generating the adjusted analyte data including reducing a background signal in the analyte signal in accordance with an offset signal; computing an analyte value based on the adjusted analyte data; and displaying the analyte value on a display device.

The method may further include: displaying a trend indicator; displaying an analyte level; generating an alert; or controlling a medication delivery device.

The reducing the background signal may include: subtracting an offset from the analyte signal to generate an offset corrected signal; calculating a plurality of sensitivities from the offset corrected signal, each sensitivity corresponding to a reference point of a plurality of analyte reference points; computing a median of the sensitivities over a time window; calibrating the adjusted analyte data to the offset corrected signal based on the median of the sensitivities; and pairing the adjusted analyte data with the reference points.

The offset may be computed from a global time-varying background offset based on an elapsed time since activation of the analyte sensor device to compute the offset corrected signal.

The offset may be a time-invariant offset.

The analyte sensor device may include: a first working electrode on the sensor tail, the first working electrode having a first sensitivity; and a second working electrode on the sensor tail, the second working electrode having a second sensitivity lower than the first sensitivity.

The first working electrode may have a first active region having a first quantity of a catalyst disposed thereon, and the second working electrode may have a second active region having a second quantity of the catalyst disposed thereon, the second active region having a surface area smaller than that of the first active region.

The reducing the background signal may include: detecting the analyte signal from the first working electrode; detecting a second analyte signal from the second working electrode; computing a difference between the analyte signal and the second analyte signal; and computing the adjusted analyte data based on the difference between the analyte signal and the second analyte signal.

The method may further include computing an individual background offset based on the analyte signal, the second analyte signal, and the difference between the analyte signal and the second analyte signal.

The second working electrode may be configured to measure an individual background current, and the offset signal may be calculated based on the individual background current.

The method may further include: applying a temperature correction on the analyte signal based on a temperature from a temperature sensor of the analyte sensor device.

The sensor tail may extend from a body of the analyte sensor device, and the analyte sensor device may include: a first working electrode on the sensor tail, the first working electrode having a first sensing layer at a first position along the sensor tail; and a second working electrode on the sensor tail, the second working electrode having a second sensing layer at a second position along the sensor tail, the second position being proximal to the first position.

The method may further include detecting a system fault of the analyte sensor device by: detecting the analyte signal from the first working electrode; detecting a second analyte signal from the second working electrode; computing one or more metrics of agreement between the analyte signal and the second analyte signal; comparing the one or more metrics of agreement against a threshold; and detecting the system fault of the analyte sensor device when the one or more metrics of agreement exceed the threshold.

The system fault may be late sensor attenuation (LSA).

The method may further include correcting for the system fault by: computing an orthogonal fit between the analyte signal and the second analyte signal; computing a fixed offset based on the orthogonal fit; and correcting the analyte signal or the second analyte signal based on the fixed offset.

The method may further include correcting for the system fault by: computing an orthogonal fit between the analyte signal and the second analyte signal; computing a time-varying offset based on the orthogonal fit; and correcting the analyte signal or the second analyte signal based on the time-varying offset.

According to one embodiment of the present disclosure, an analyte device includes: a plurality of communication circuitry; and a plurality of processing circuitry having memory storing instructions that, when executed by the processing circuitry, cause the processing circuitry to: receive an analyte signal measured from an analyte sensor device having a sensor tail, the analyte signal being received via the communication circuitry; generate adjusted analyte data based on the analyte signal, including instructions that cause the processing circuitry to reduce a background signal in the analyte signal in accordance with an offset signal; compute an analyte value based on the adjusted analyte data; and display the analyte value on a display device.

The memory may further store instructions that, when executed by the processing circuit, cause the processing circuitry to: display a trend indicator; display an analyte level; generate an alert; or control a medication delivery device.

The instructions to reduce the background signal may include instructions that, when executed by the processing circuit, cause the processing circuitry to: subtract an offset from the analyte signal to generate an offset corrected signal; calculate a plurality of sensitivities from the offset corrected signal, each sensitivity corresponding to a reference point of a plurality of analyte reference points; compute a median of the sensitivities over a time window; calibrate the adjusted analyte data to the offset corrected signal based on the median of the sensitivities; and pair the adjusted analyte data with the reference points.

The offset may be computed from a global time-varying background offset based on an elapsed time since activation of the analyte sensor device to compute the offset corrected signal.

The offset may be a time-invariant offset.

The analyte sensor device may include: a first working electrode on the sensor tail, the first working electrode having a first sensitivity; and a second working electrode on the sensor tail, the second working electrode having a second sensitivity lower than the first sensitivity.

The first working electrode may have a first active region having a first quantity of a catalyst disposed thereon, and the second working electrode may have a second active region having a second quantity of the catalyst disposed thereon, the second active region having a surface area smaller than that of the first active region.

The instructions to reduce the background signal may include instructions that, when executed by the processing circuit, cause the processing circuitry to: detect the analyte signal from the first working electrode; detect a second analyte signal from the second working electrode; compute a difference between the analyte signal and the second analyte signal; and compute the adjusted analyte data based on the difference between the analyte signal and the second analyte signal.

The instructions to reduce the background signal may include instructions that, when executed by the processing circuit, cause the processing circuitry to compute an individual background offset based on the analyte signal, the second analyte signal, and the difference between the analyte signal and the second analyte signal.

The second working electrode may be configured to measure an individual background current, and the offset signal may be calculated based on the individual background current.

The memory may further store instructions that, when executed by the processing circuitry, cause the processing circuitry to: apply a temperature correction on the analyte signal based on a temperature from a temperature sensor of the analyte sensor device.

The sensor tail may extend from a body of the analyte sensor device, and the analyte sensor device may include: a first working electrode on the sensor tail, the first working electrode having a first sensing layer at a first position along the sensor tail; and a second working electrode on the sensor tail, the second working electrode having a second sensing layer at a second position along the sensor tail, the second position being proximal to the first position.

The memory may further store instructions that, when executed by the processing circuitry, cause the processing circuitry to detect a system fault of the analyte sensor device by: detecting the analyte signal from the first working electrode; detecting a second analyte signal from the second working electrode; computing one or more metrics of agreement between the analyte signal and the second analyte signal; comparing the one or more metrics of agreement against a threshold; and detecting the system fault of the analyte sensor device when the one or more metrics of agreement exceed the threshold.

The system fault may be late sensor attenuation (LSA).

The memory may further store instructions that, when executed by the processing circuitry, cause the processing circuitry to correct for the system fault by: computing an orthogonal fit between the analyte signal and the second analyte signal; computing a fixed offset based on the orthogonal fit; and correcting the analyte signal or the second analyte signal based on the fixed offset.

The memory may further store instructions that, when executed by the processing circuitry, cause the processing circuitry to correct for the system fault by: computing an orthogonal fit between the analyte signal and the second analyte signal; computing a time-varying offset based on the orthogonal fit; and correcting the analyte signal or the second analyte signal based on the time-varying offset.

According to one embodiment of the present disclosure, an analyte sensor device includes: a sensor tail including: a first working electrode on the sensor tail, the first working electrode having a first sensitivity; and a second working electrode on the sensor tail, the second working electrode having a second sensitivity lower than the first sensitivity.

The first working electrode may have a first active region having a first quantity of a catalyst disposed thereon, and the second working electrode may have a second active region having a second quantity of the catalyst disposed thereon, the second active region having a surface area smaller than that of the first active region.

The analyte sensor device may further include a processor and memory, the memory storing instructions that, when executed by the processor, cause the processor to: measure an analyte signal based on the first working electrode; and reduce a background signal in the analyte signal in accordance with an offset signal.

The memory further may store instructions, that, when executed by the processor, cause the processor to reduce the background signal by: subtract an offset from the analyte signal to generate an offset corrected signal; calculate a plurality of sensitivities from the offset corrected signal, each sensitivity corresponding to a reference point of a plurality of analyte reference points; compute a median of the sensitivities over a time window; calibrate the adjusted analyte data to the offset corrected signal based on the median of the sensitivities; and pair the adjusted analyte data with the reference points.

The offset may be computed from a global time-varying background offset based on an elapsed time since activation of the analyte sensor device to compute the offset corrected signal.

The offset may be a time-invariant offset.

The first working electrode may have a first active region having a first quantity of a catalyst disposed thereon, the second working electrode may have a second active region having a second quantity of the catalyst disposed thereon, the second active region having a surface area smaller than that of the first active region, and the instructions to reduce the background signal may include instructions that, when executed by the processor, cause the processor to: detect the analyte signal from the first working electrode; detect a second analyte signal from the second working electrode; compute a difference between the analyte signal and the second analyte signal; and compute the adjusted analyte data based on the difference between the analyte signal and the second analyte signal.

The memory may further store instructions that, when executed by the processor, cause the processor to compute an individual background offset based on the analyte signal, the second analyte signal, and the difference between the analyte signal and the second analyte signal.

The memory may further store instructions that, when executed by the processor, cause the processor to compute an individual background offset based on the analyte signal, the second analyte signal, and the difference between the analyte signal and the second analyte signal.

The analyte sensor device may further include a processor and memory, the memory storing instructions that, when executed by the processor, cause the processor to: apply a temperature correction on the analyte signal based on a temperature from a temperature sensor of the analyte sensor device.

BRIEF DESCRIPTION OF THE DRAWINGS

The accompanying drawings, together with the specification, illustrate exemplary embodiments of the present disclosure, and, together with the description, serve to explain the principles of the present disclosure.

DETAILED DESCRIPTION

Figure 1:
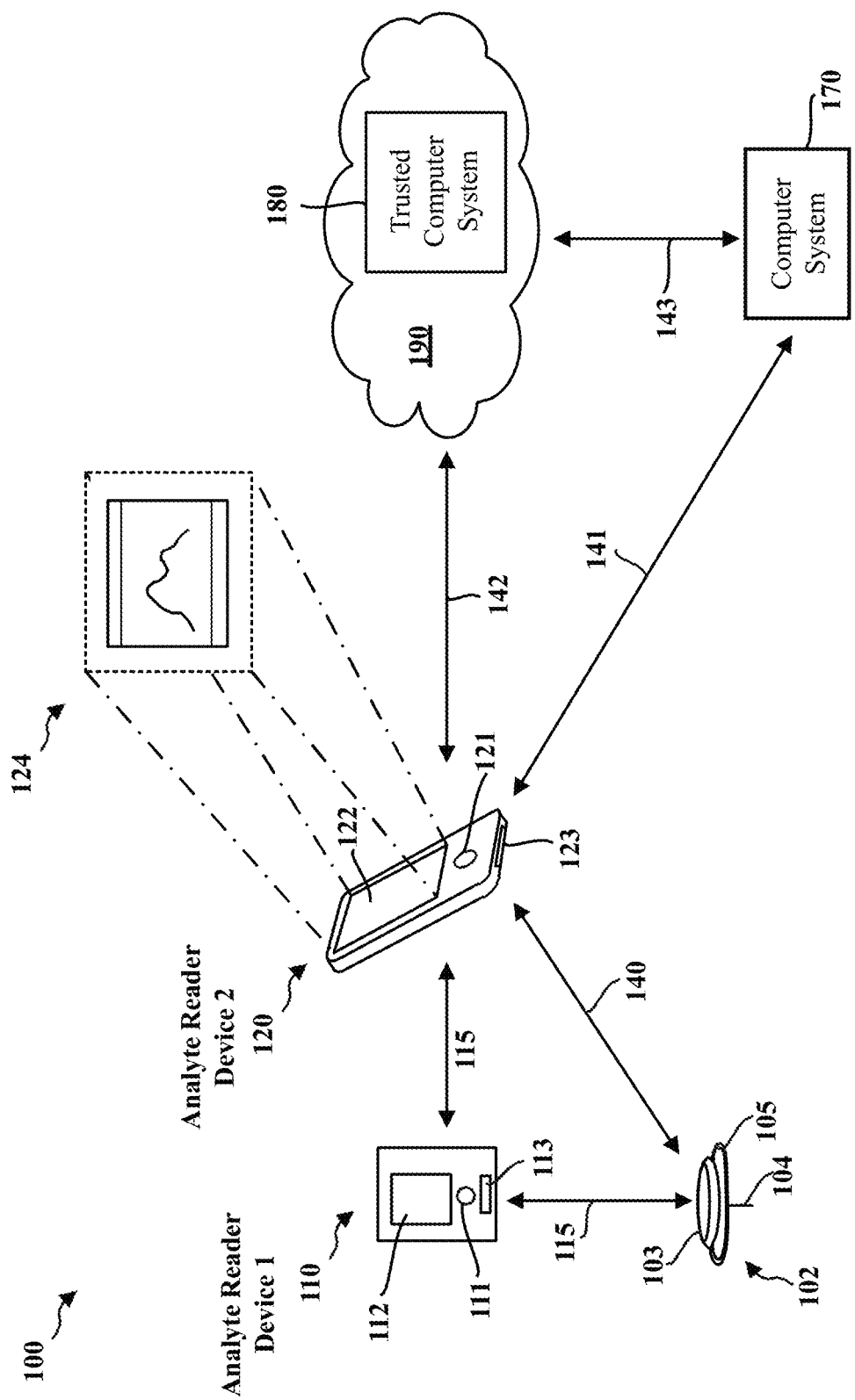
FIG. 1 is a diagram illustrating an in vivo analyte monitoring system that may be used with embodiments of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein.

The publications discussed herein are provided solely for their disclosure prior to the filing date of the present application. Nothing herein is to be construed as an admission that the present disclosure is not entitled to antedate such publications by virtue of prior disclosure. Furthermore, the dates of publication provided may be different from the actual publication dates, which may need to be independently confirmed.

Generally, embodiments of the present disclosure are used with systems, devices, and methods for detecting at least one analyte, such as glucose, in a bodily fluid, such as subcutaneously within the interstitial fluid ("ISF") or blood, within the dermal fluid of the dermal layer, or otherwise. Accordingly, many embodiments include in vivo analyte sensors structurally configured so that at least a portion of the sensor is, or can be, positioned in the body of a user (e.g., several millimeters below the surface of the skin) to obtain information about at least one analyte of the body. However, the embodiments disclosed herein can be used with in vivo analyte monitoring systems that incorporate in vitro capability, as well as purely in vitro or ex vivo analyte monitoring systems, including those systems that are entirely non-invasive.

Furthermore, for each and every embodiment of a method disclosed herein, systems and devices capable of performing each of those embodiments are covered within the scope of the present disclosure. For example, embodiments of analyte sensor devices are disclosed, and these devices can have one or more sensors, analyte monitoring circuitry (e.g., an analog circuit), non-transitory memories (e.g., for storing instructions), power sources, communication circuitry, transmitters, receivers, processing circuitry, and/or controllers (e.g., for executing instructions) that can perform any and all method operations or that can facilitate the execution of any and all method operations. These analyte sensor device embodiments can be used and can be capable of use to implement those operations performed by an analyte sensor device according to any and all of the methods described herein.

Likewise, disclosed herein are embodiments of analyte reader devices having one or more transmitters, receivers, non-transitory memories (e.g., for storing instructions), power sources, processing circuitry, and/or controllers (e.g., for executing instructions) that can perform any and all method operations or that can facilitate the execution of any and all method operations. These embodiments of analyte reader devices can be used to implement those operations performed by a reader device according to any and all of the methods described herein.

Embodiments of trusted computer systems are also disclosed. These trusted computer systems can include one or more processing circuitry, controllers, transmitters, receivers, non-transitory memories, databases, servers, and/or networks, and can be discretely located or distributed across multiple geographic locales. These embodiments of trusted computer systems can be used to implement those operations performed by a trusted computer system according to any and all of the methods described herein.

Returning to the discussion of analyte sensor devices, amperometric biosensors provide one class of analyte sensors that generate an electrical signal by applying an electrical voltage (or electrical potential) between electrodes in order to oxidize or reduce various analytes. The system for measuring the output of the analyte sensor is usually configured so that the measured current (i) is linearly correlated with the analyte concentration (C) of the analyte or analytes of interest and can be characterized as:

$$i = m*C + b$$

where m is the signal sensitivity that is driven by the performance of the detection scheme based on the biochemical reactions. While the intercept b in the above linear equation could be an "artificial" result of forcibly fitting linear regression to a non-linear system, in practice, a real background current does exist and can contribute significantly to the increased intercept values. The background current is mainly due to the simultaneous electrochemical reactions of other, non-targeted electroactive compounds in the testing environment, such as subcutaneous interstitial fluid. These non-targeted electroactive compounds are generally considered as interferents and may include, for example, in the case of a glucose sensor, acetaminophen, ascorbic acid, bilirubin, cholesterol, creatinine, cysteine, dopamine, ephedrine, glutathione, ibuprofen, L-dopa, methyldopa, salicylate, tetracycline, tolazamide, tolbutamide, triglycerides, and uric acid.

In addition, in a minority of the sensor wears, the output of the analyte sensor may exhibit effects referred to as early sensor attenuation (ESA) and late sensor attenuation (LSA). Early sensor attenuation and late sensor attenuation refer to effects where an analyte signal attenuates for an analyte sensor at an early portion or late portion in the life of the sensor, respectively. As one example, an analyte sensor may be designed for use over the course of two weeks and therefore the life of the sensor may be two weeks; however, embodiments of the present disclosure are not limited thereto and may be applied to sensors having shorter or longer useful lifetimes. Early sensor attenuation may occur due to various factors, such as a user's foreign body response around the puncture site of the implanted analyte sensor. Such foreign body response, which may ultimately result in the formation of a foreign body capsule around the implanted analyte sensor, may inhibit correct readings from the analyte sensor for a short period after implantation, typically in the first 24 hours of the life of the sensor, and more specifically the first 1 to 12 hours. Late sensor attenuation may also occur due to various factors, including the ineffectiveness of an adhesive adhering the analyte sensor to the skin of a user and/or a user's foreign body response including the aforementioned formation of the foreign body capsule. Late sensor attenuation may occur in a late portion of wear of the analyte sensor, and may affect sensors designed for more than 10 days of wear. Early sensor attenuation and late sensor attenuation cause glucose readings to be artificially low. Accordingly, users relying on such readings may take incorrect actions to increase their glucose levels when no such action may actually be needed (e.g., based on actual blood glucose levels).

Some embodiments of the present disclosure relate to improvements to computer-implemented capabilities of analyte monitoring systems with respect to improving the accuracy of a signal generated by an analyte sensor, the detection of a suspected analyte sensor fault, and/or the detection of reduced signal response of an analyte sensor. In some embodiments, for example, an analyte sensor device is worn on the body, where the analyte sensor device includes an in vivo analyte sensor. According to one aspect of the embodiments, analyte metrics based on analyte sensor data received from the analyte sensor can be periodically calculated and updated by processing circuitry of an analyte sensor device. The analyte metrics can include, for example, a recent analyte level percentile metric, a variability metric, a central tendency metric, a variance from the variability metric and the central tendency metric to a predetermined hypoglycemia risk function, a baseline analyte level metric, and a baseline hypoglycemia risk metric. Based on the analyte metrics, the processing circuitry can detect a suspected reduction in signal response of the analyte sensor. In other embodiments, an analyte reader device can receive real-time, near real-time, or historical analyte sensor data transmitted from the analyte sensor device and, subsequently, determine a suspected reduction in signal response of an analyte sensor.

As such, aspects of embodiments of the present disclosure relate to systems and methods for increasing the accuracy of the measurements of an analyte sensor, including the reduction of the background signal and ESA in the measured signal (e.g., glucose metrics that track more closely with measured blood glucose levels) and the detection of LSA. As such, embodiments of the present disclosure can improve the accuracy of analyte monitoring systems by reducing background signal and by informing the user, in a timely manner, when a suspected analyte sensor fault is detected and/or when an analyte sensor should be replaced. Other features and advantages of the disclosed embodiments are further discussed below.

To provide additional context, an example of an analyte monitoring system on which embodiments of the present disclosure can be implemented will be described in more detail below. However, embodiments of the present disclosure are not limited to the particular example system described herein and may be implemented on a variety of different systems.

Example Embodiments of Analyte Monitoring Systems

There are various types of analyte monitoring systems. "Continuous Analyte Monitoring" systems (or "Continuous Glucose Monitoring" systems), for example, are in vivo systems that can transmit data from an analyte sensor device to an analyte reader device repeatedly or continuously without prompting, e.g., automatically according to a schedule, and may transfer information using a wired (e.g., a serial data connection such as Universal Serial Bus or USB) or wireless connection (e.g., using a wireless communication protocol such as Bluetooth or Bluetooth Low Energy, Wi-Fi or the like). "Flash Analyte Monitoring" systems (or "Flash Glucose Monitoring" systems or Flash Continuous Glucose Monitoring systems or "Flash" systems), as another example, are in vivo systems that can transfer data from an analyte sensor device in response to a scan or request for data by an analyte reader device, such as with a Near Field Communication (NFC), Radio Frequency Identification (RFID), or Bluetooth protocol. In vivo analyte monitoring systems can also operate without the need for finger stick (FS) calibration using, for example, blood glucose (BG) levels.

In vivo monitoring systems can include an analyte sensor that, when positioned in vivo, makes contact with the bodily fluid of the user and senses one or more analyte levels contained therein. The bodily fluid may be, for example, interstitial fluid (ISF) in the subcutaneous tissue. The analyte sensor can be part of an analyte sensor control device that resides on the body of the user and contains the electronics and power supply that enable and control the analyte sensing. The analyte sensor and the analyte sensor control device are referred to together as an analyte sensor device. The analyte sensor device, and variations thereof, can also be referred to as a "sensor control unit," "analyte sensor control unit," "analyte sensor unit," an "on-body electronics" device or unit, an "on-body" device or unit, or a "sensor data communication" device or unit, to name a few. As used herein, these terms are not limited to devices with analyte sensors, and encompass devices that have sensors of other types, whether biometric or non-biometric. The term "on body" (or "on-body") refers to any device that resides directly on the body or in close proximity to the body, such as a wearable device (e.g., glasses, watch, wristband or bracelet, neckband or necklace, etc.).

In vivo monitoring systems can also include one or more analyte reader devices that receive sensed analyte data from the analyte sensor device. These analyte reader devices can process and/or display the sensed analyte data, or sensor data, in any number of forms, to the user. These devices, and variations thereof, can be referred to as "handheld reader devices," "reader devices" (or "readers"), "handheld electronics" (or "handhelds"), "portable data processing" devices or units, "data receivers," "receiver" devices or units (or "receivers"), "relay" devices or units, or "remote" devices or units, to name a few. Other devices, such as personal computers, have also been utilized with or incorporated into in vivo and in vitro monitoring systems. For example, in some embodiments of the present disclosure, a smartphone, tablet computer, or personal digital assistant may operate as an analyte reader device through the use of a software application (or app) installed on the device. Such devices may run operating systems, such as Android® developed by Google LLC or iOS® developed by Apple Inc. For the sake of convenience, the term "smartphone" will be used herein to refer to any of a variety of personal electronic devices including smartphones, personal digital assistants, tablet computers, and similar devices.

In vivo analyte monitoring systems can be differentiated from "in vitro" systems that contact a biological sample outside of the body (or, rather, "ex vivo") and that typically include a meter device that has a port for receiving an analyte test strip carrying a bodily fluid of the user (e.g., blood from a finger stick), which can be analyzed to determine the user's analyte level. The embodiments described herein can be used with in vivo systems, in vitro systems, and combinations thereof.

The embodiments described herein can be used to monitor and/or process information regarding any number of one or more different analytes. Analytes that may be monitored include, but are not limited to, acetyl choline, amylase, bilirubin, cholesterol, chorionic gonadotropin, glycosylated hemoglobin (HbA1c), creatine kinase (e.g., CK-MB), creatine, creatinine, DNA, fructosamine, glucose (e.g., blood glucose and/or interstitial glucose), glucose derivatives, glutamine, growth hormones, hormones, ketones, ketone bodies, lactate, peroxide, prostate-specific antigen, prothrombin, RNA, thyroid stimulating hormone, and troponin. The concentration of drugs, such as, for example, antibiotics (e.g., gentamicin, vancomycin, and the like), digitoxin, digoxin, theophylline, and warfarin, may also be monitored. In embodiments that monitor more than one analyte, the analytes may be monitored at the same or different times.

FIG. 1 is a diagram illustrating an in vivo analyte monitoring system 100 that may be used with embodiments of the present disclosure. The in vivo analyte monitoring system includes an analyte sensor device 102 and one or more analyte reader devices 110, 120 that communicate with the analyte sensor device 102 over a local communication link or path 140, which can be wired or wireless, and unidirectional or bidirectional. In embodiments where path 140 is wireless, a near-field communication (NFC) protocol, radio frequency identification (RFID) protocol, Bluetooth or Bluetooth Low Energy (BLE) protocol, Wi-Fi protocol, proprietary protocol, or the like can be used, including those communication protocols in existence as of the date of this filing or their later-developed variants. Each of the analyte reader devices 110, 120 is also capable of wired, wireless, or combined communication with a computer system 170 (e.g., a local or remote computer system) over communication path (or link) 141 and with a network 190, such as the Internet or the cloud, over communication path (or link) 142. Communication with network 190 can involve communication with trusted computer system 180 within network 190, or though network 190 to computer system 170 via communication link (or path) 143. Communication paths 141, 142, and 143 can be wireless, wired, or both, can be unidirectional or bidirectional, and can be part of a telecommunications network, such as a Wi-Fi network, a local area network (LAN), a wide area network (WAN), the Internet, or other data network. In some cases, communication paths 141 and 142 can be the same path. All communications over paths 140, 141, and 142 can be encrypted, and the analyte sensor device 102, the one or more analyte reader devices 110, 120, computer system 170, and trusted computer system 180 can each be configured to encrypt and decrypt those communications sent and received. The analyte reader devices 110, 120 may synchronize 115 or otherwise exchange data with each other. In one example, the analyte reader device 110 may be a dedicated analyte reader device, and may include a port 113 for a test strip through which analyte levels can be analyzed and analyte data can be obtained, while the other of the analyte reader devices 120 may be a cell phone (e.g., smartphone) or another device (whose primary purpose may be other than for providing analyte reader capabilities) on which an analyte reader software application is installed and accessible.

Variants of devices 102 and 110/120, as well as other components of an in vivo-based analyte monitoring system that are suitable for use with the system, device, and method embodiments set forth herein, are described in U.S. Pat. App. Pub. No. 2011/0213225 (the '225 Publication), which is incorporated by reference herein in its entirety for all purposes.

The analyte sensor device 102 can include a housing 103 containing in vivo analyte monitoring circuitry and a power source. In this embodiment, the in vivo analyte monitoring circuitry is electrically coupled with an analyte sensor 104 that extends through an adhesive patch 105 and projects away from housing 103. Adhesive patch 105 contains an adhesive layer for attachment to a skin surface of the body of the user. Other forms of body attachment to the body may be used, in addition to or instead of adhesive.

The analyte sensor 104 is configured to be at least partially inserted into the body of the user, where it can make fluid contact with that user's bodily fluid (e.g., subcutaneous (subdermal) fluid, dermal fluid, or blood) and be used, along with the in vivo analyte monitoring circuitry, to measure analyte-related data of the user. The analyte sensor 104 and any accompanying sensor control electronics can be applied to the body in any desired manner. For example, an insertion device can be used to position all or a portion of the analyte sensor 104 through an external surface of the user's skin and into contact with the user's bodily fluid. In doing so, the insertion device can also adhere the analyte sensor device 102 onto the user's skin using an adhesive patch 105. In other embodiments, the insertion device can position the analyte sensor 104 first, and then accompanying sensor control electronics can be coupled with the analyte sensor 104 afterwards, either manually or with the aid of a mechanical device. Examples of insertion devices are described in U.S. Pat. App. Pub. Nos. 2008/0009692, 2011/0319729, 2015/0018639, 2015/0025345, and 2015/0173661, all which are incorporated by reference herein in their entireties and for all purposes.

After collecting raw data from the user's body, the analyte sensor device 102 can apply analog signal conditioning to the data and convert the data into a digital form of the conditioned raw data. In some embodiments, the analyte sensor device 102 can then algorithmically process the digital raw data into a form that is representative of the user's measured biometric (e.g., analyte level) and/or one or more analyte metrics based thereupon. For example, the analyte sensor device 102 can include processing circuitry to algorithmically perform any of the method operations described herein to calculate analyte metrics utilized to detect a reduction in signal response by the analyte sensor. The analyte sensor device 102 can then encode and wirelessly communicate the calculated analyte metrics, indications of sensor fault and/or processed sensor data to the analyte reader device 110/120, which in turn can format or graphically process the received data for digital display 124 to the user. In other embodiments, in addition to, or in lieu of, wirelessly communicating sensor data to another device (e.g., the analyte reader device 110/120), the analyte sensor device 102 can graphically process the final form of the data such that it is ready for display, and display that data on a display of the analyte sensor device 102. In some embodiments, the final form of the biometric data (prior to graphic processing) is used by the system (e.g., incorporated into a diabetes monitoring regime) without processing for display to the user.

In still other embodiments, the conditioned raw digital data can be encoded for transmission to another device, e.g., the analyte reader device 110/120, which then algorithmically processes that digital raw data into a form representative of the user's measured biometric (e.g., a form readily made suitable for display to the user) and/or one or more analyte metrics based thereupon. The analyte reader device 110/120 can include processing circuitry to algorithmically perform any of the method operations described herein to calculate analyte metrics utilized to detect a reduction in signal response by the analyte sensor. This algorithmically processed data can then be formatted or graphically processed for digital display to the user or used to control other actions, such as controlling the operation of a medication delivery device (e.g., an insulin pump).

In other embodiments, the analyte sensor device 102 and the analyte reader device 110/120 transmit the digital raw data to another computer system for algorithmic processing and display.

The analyte reader device 110/120 can include a display 112/122 to output information (e.g., to the user interface of the digital display 124) to the user and/or to accept an input from the user, and one or more optional input components 111/121, such as a button, actuator, touch-sensitive switch, capacitive switch, pressure-sensitive switch, jog wheel or the like, to input data, commands, or otherwise control the operation of the analyte reader device 110/120. In certain embodiments, the display 112/122 and input component 111/121 may be integrated into a single component, for example, where the display can detect the presence and location of a physical contact touch upon the display, such as a touchscreen user interface. In certain embodiments, the input component 111/121 of the analyte reader device 110/120 may include a microphone and the analyte reader device 110/120 may include software configured to analyze audio input received from the microphone, such that functions and operation of the analyte reader device 110/120 may be controlled by voice commands. In certain embodiments, an output component of the analyte reader device 110/120 includes a speaker for outputting information as audible signals. Similar voice-responsive components such as a speaker, microphone and software routines to generate, to process, and to store voice-driven signals may be included in the analyte sensor device 102.

The analyte reader device 120 can also include one or more data communication ports 123 for wired data communication with external devices such as the computer system 170 or the analyte sensor device 102. The analyte reader device 110 may also include one or more data communication ports for wired data communication with external devices such as the computer system 170 or the analyte sensor device 102. Example data communication ports include USB ports, mini USB ports, USB Type-C ports, USB micro-A and/or micro-B ports, RS-232 ports, Ethernet ports, FireWire ports, or other similar data communication ports configured to connect to the compatible data cables. As discussed above, the analyte reader device 110 may also include an integrated or attachable in vitro glucose meter, including an in vitro test strip port 113 to receive an in vitro glucose test strip for performing in vitro blood glucose measurements.

The analyte reader device 110/120 can display the measured biometric data wirelessly received from the analyte sensor device 102 and can also be configured to output alarms, alert notifications, glucose values, etc., which may be visual, audible, tactile, or any combination thereof. Further details and other display embodiments can be found in, e.g., U.S. Pat. App. Pub. No. 2011/0193704, which is incorporated herein by reference in its entirety for all purposes. The terms "glucose value," "glucose level," and "glucose data" may be used interchangeably herein, where these terms refer to the measured concentration of glucose (or "sugar") in the blood or interstitial fluid. The measured concentration of glucose may be a raw signal measured by the analyte sensor device 102 that employs amperometry, coulometry, voltammetry, colorimetric technique, optical technique, or the like, or a corresponding converted glucose concentration number in mg/dL or mmol/L or equivalent measurements.

The analyte reader device 110/120 can function as a data conduit to transfer the measured data and/or analyte metrics from the analyte sensor device 102 to the computer system 170 or the trusted computer system 180. In some embodiments, the data received from the analyte sensor device 102 may be stored (permanently or temporarily) in one or more memories of the analyte reader device 110/120 prior to uploading to the computer system 170, trusted computer system 180, or network 190.

The computer system 170 may be a personal computer, a server terminal, a laptop computer, a smartphone, a tablet, or other suitable data processing device. The computer system 170 can be (or include) software for data management and analysis and communication with the components in the analyte monitoring system 100. The computer system 170 can be used by the user or a medical professional to display and/or to analyze the biometric data measured by the analyte sensor device 102. In some embodiments, the analyte sensor device 102 can communicate the biometric data directly to the computer system 170 without an intermediary such as the analyte reader device 110/120, or indirectly using an Internet connection (also optionally without first sending to the analyte reader device 110/120). Operation and use of the computer system 170 is further described in the '225 Publication incorporated herein. The analyte monitoring system 100 can also be configured to operate with a data processing module, also as described in the incorporated '225 Publication.

The trusted computer system 180 can be within the possession of the manufacturer or distributor of the analyte sensor device 102, either physically or virtually through a secured connection, and can be used to perform authentication of the analyte sensor device 102, for secure storage of the user's biometric data, and/or as a server that serves a data analytics program (e.g., accessible via a web browser) for performing analysis on the user's measured data.

Example Embodiments of Analyte Reader Devices

The analyte reader device 110/120 can be a mobile communication device such as a dedicated reader device (configured for communication with an analyte sensor device 102, and optionally a computer system 170, but without mobile telephony communication capability) or a mobile telephone including, but not limited to, a Wi-Fi or Internet-enabled smartphone, smart watch, tablet, or personal digital assistant (PDA). Examples of smartphones can include those mobile phones based on a Windows® operating system, Android™ operating system, iPhone® operating system, Palm® WebOS™, Blackberry® operating system, or Symbian® operating system, with data network connectivity functionality for data communication over an Internet connection and/or a LAN.

The analyte reader device 110/120 can also be configured as a mobile smart wearable electronics assembly, such as an optical assembly that is worn over or adjacent to the user's eye (e.g., a smart glass or smart glasses, such as Google glasses, which is a mobile communication device). This optical assembly can have a transparent display that displays information about the user's analyte level (as described herein) to the user while at the same time allowing the user to see through the display such that the user's overall vision is minimally obstructed. The optical assembly may be capable of wireless communications similar to a smartphone. Other examples of wearable electronics include devices that are worn around or in the proximity of the user's wrist (e.g., a watch, etc.), neck (e.g., a necklace, etc.), head (e.g., a headband, hat, etc.), chest, or the like.

Figure 2:
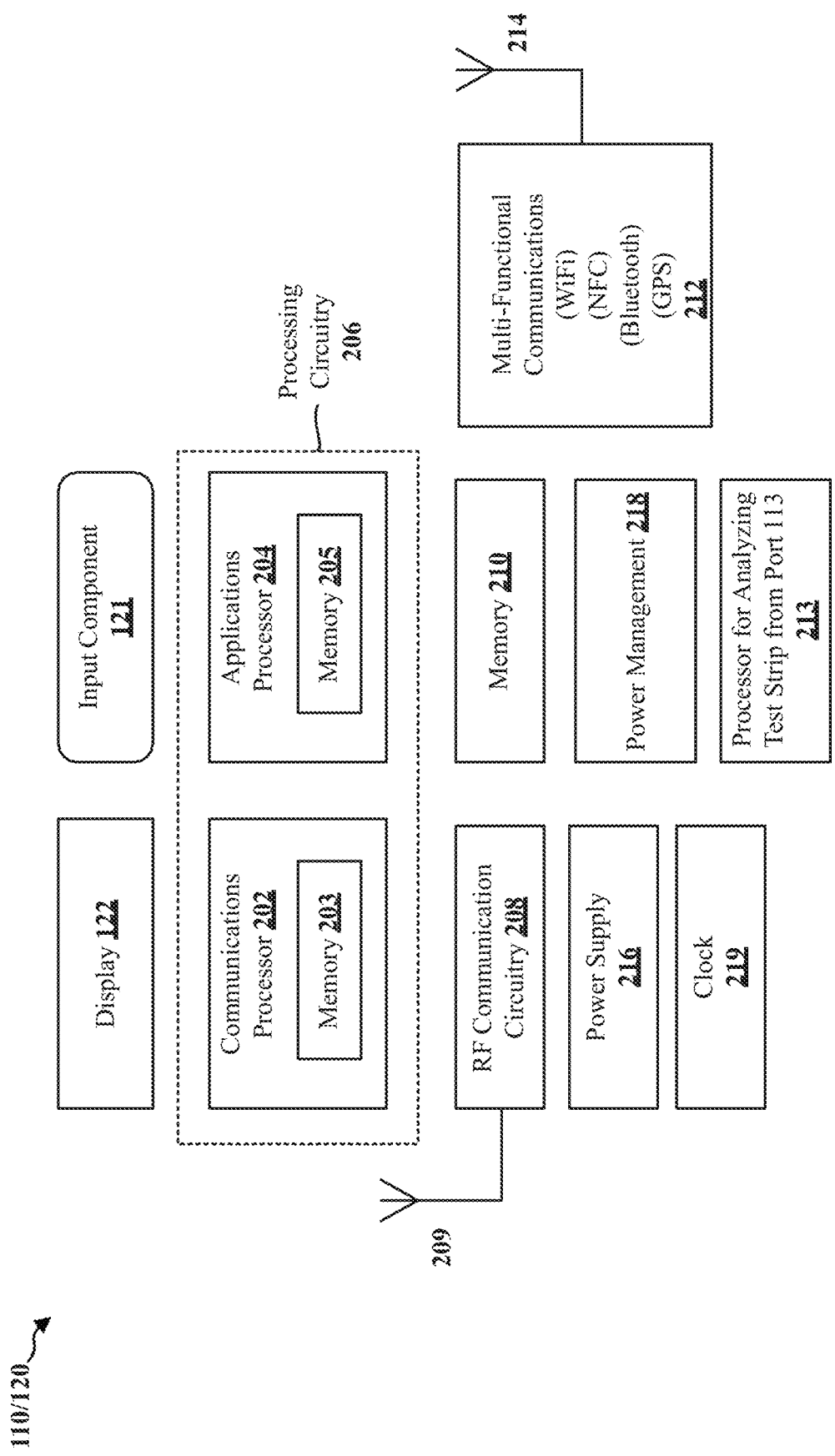
FIG. 2 is a block diagram of an analyte reader device that may be used with embodiments of the present disclosure.

FIG. 2 is a block diagram of an analyte reader device 110/120. The analyte reader device 110/120 may include an input component 111/121, display 112/122, and processing circuitry 206, which can include one or more processors, microprocessors, controllers, and/or microcontrollers, each of which can be a discrete chip or distributed amongst (and a portion of) a number of different chips. The processing circuitry 206 may include a communications processor 202 having on-board memory 203 and an applications processor 204 having on-board memory 205. The analyte reader device 110/120 (and specifically the analyte reader device 110) may include a processor 213 for analyzing/processing in vitro blood glucose measurements from the port 113. The analyte reader device 110/120 further includes radio frequency (RF) communication circuitry 208 coupled with an RF antenna 209, a memory 210, multi-functional communications circuitry 212 with one or more associated antennas 214, a power supply 216, power management circuitry 218, and a clock 219. FIG. 2 is an abbreviated representation of the typical hardware and functionality that resides within a smartphone, and those of ordinary skill in the art will readily recognize that other hardware and functionality (e.g., codecs, drivers, glue logic) can also be included.

The communications processor 202 can interface with RF communication circuitry 208 and perform analog-to-digital conversions, encoding and decoding, digital signal processing and other functions that facilitate the conversion of voice, video, and data signals into a format (e.g., in-phase and quadrature) suitable for provision to RF communication circuitry 208, which can then transmit the signals wirelessly. The communications processor 202 can also interface with RF communication circuitry 208 to perform the reverse functions necessary to receive a wireless transmission and convert it into digital data, voice, and video. RF communication circuitry 208 can include a transmitter and a receiver (e.g., integrated as a transceiver) and associated encoder logic.

The applications processor 204 can be adapted to execute the operating system and any software applications that reside on the analyte reader device 110/120, process video and graphics, and perform those other functions not related to the processing of communications transmitted and received over RF antenna 209. The operating system may operate in conjunction with a number of applications on the analyte reader device 110/120 (e.g., specifically for the analyte reader device 120). For the analyte reader device 120, any number of applications (also known as "user interface applications") can be running on the analyte reader device 120 at any one time, and may include one or more applications that are related to a diabetes monitoring regime, in addition to the other commonly used applications that are unrelated to such a regime, e.g., email, calendar, weather, sports information, games, etc. For example, the data indicative of a sensed analyte level and in vitro blood analyte measurements received by the analyte reader device can be securely communicated to user interface applications residing in memory 210 of the analyte reader device 120. Such communications can be securely performed, for example, through the use of mobile application containerization, isolation, or wrapping technologies.

The memory 210 can be shared by one or more of the various functional units present within the analyte reader device 110/120, or can be distributed amongst two or more of them (e.g., as separate memories present within different chips). The memory 210 can also be a separate chip of its own. The memories 203, 205, and 210 are non-transitory, and can be volatile (e.g., RAM, etc.) and/or non-volatile memory (e.g., ROM, flash memory, F-RAM, etc.).

The multi-functional communications circuitry 212 can be implemented as one or more chips and/or components (e.g., transmitter, receiver, transceiver, and/or other communication circuitry) that perform other functions such as local wireless communications, e.g., with the analyte sensor device 102 under the appropriate protocol (e.g., Wi-Fi, Bluetooth, Bluetooth Low Energy, NFC, RFID, proprietary protocols, and others) and determining the geographic position of the analyte reader device 110/120 (e.g., global positioning system (GPS) hardware). One or more other antennas 214 are associated with the multi-functional communications circuitry 212 as needed to operate with the various protocols and circuits.

The power supply 216 can include one or more batteries, which can be rechargeable or single-use disposable batteries. The power management circuitry 218 can regulate battery charging and power supply monitoring, boost power, perform DC-DC voltage conversions, and the like.

The analyte reader device 110/120 can also include or be integrated with a drug (e.g., insulin, etc.) delivery device such that they, e.g., share a common housing. Examples of such drug delivery devices or medication delivery devices can include medication pumps having a cannula that remains in the body to allow infusion over a multi-hour or multi-day period (e.g., wearable pumps for the delivery of basal and bolus insulin). The analyte reader device 110/120, when combined with a medication delivery device, can include a reservoir to store the drug, a mechanical actuator such as a solenoid or motor configured to control a device such as a pump or syringe, connectable to transfer tubing, and an infusion cannula. The mechanical actuator can control the pump or syringe (or other drug delivery mechanism) to force the drug from the reservoir, through the tubing and into the body of a person with diabetes by way of the cannula inserted therein. Other examples of drug delivery devices that can be included with (or integrated with) the analyte reader device 110/120 include portable injection devices that pierce the skin only for each delivery and are subsequently removed (e.g., insulin pens). An analyte reader device 110/120, when combined with a portable injection device, can include an injection needle, a cartridge for carrying the drug, an interface for controlling the amount of drug to be delivered, and an actuator to cause injection to occur. The device can be used repeatedly until the drug is exhausted, at which point the combined device can be discarded, or the cartridge can be replaced with a new one, at which point the combined device can be reused repeatedly. The needle can be replaced after each injection.

The combined device can function as part of a closed-loop system (e.g., an artificial pancreas system requiring no user intervention to operate) or semi-closed loop system (e.g., an insulin loop system requiring occasional user intervention to operate, such as to confirm changes in dose). For example, the combined device may be implanted on the skin of a person with diabetes (or patient), and the patient's analyte level can be monitored in a repeated automatic fashion by the analyte sensor device 102, which can then communicate that monitored analyte level to the analyte reader device 110/120, which automatically determines the appropriate drug dosage to control the patient's analyte level and subsequently controls the medication delivery device to deliver the determined dosage to the patient's body. Software instructions for controlling the pump and the amount of insulin delivered can be stored in the memory of the analyte reader device 110/120 and executed by the reader device's processing circuitry. These instructions can also cause calculation of drug delivery amounts and durations (e.g., a bolus infusion and/or a basal infusion profile) based on the analyte level measurements obtained directly or indirectly from the analyte sensor device 102. In some embodiments, the analyte sensor device 102 can determine the drug dosage and communicate that to the analyte reader device 110/120.

Example Embodiments of Sensor Control Devices

Figure 3:
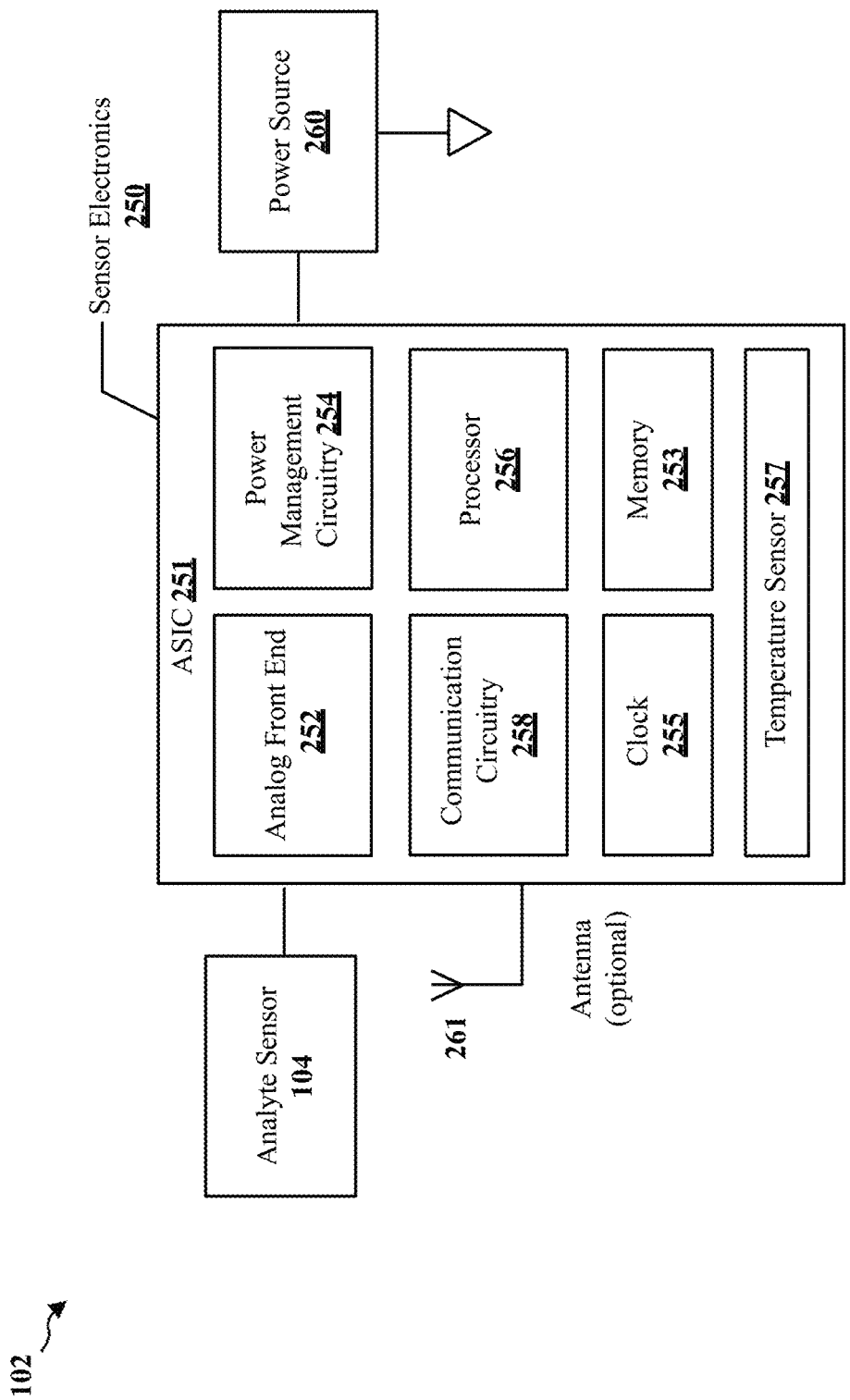
FIG. 3 is a block diagram of an analyte sensor device that may be used with embodiments of the present disclosure.

FIG. 3 is a block diagram of an analyte sensor device 102. The analyte sensor device 102 has an analyte sensor 104 and sensor electronics 250 (including analyte monitoring circuitry) that can have the majority of the processing capability for rendering end-result data suitable for display to the user. In FIG. 3, a single semiconductor chip 251 is depicted that can be a custom application specific integrated circuit (ASIC). Shown within ASIC 251 are certain high-level functional units, including an analog front end (AFE) 252, power management (or control) circuitry 254, processor 256, and communication circuitry 258 (which can be implemented as a transmitter, receiver, transceiver, passive circuit, or otherwise according to the communication protocol). In this embodiment, both AFE 252 and processor 256 are used as analyte monitoring circuitry, but in other embodiments either circuit can perform the analyte monitoring function. Processor 256 can include one or more processors, microprocessors, controllers, and/or microcontrollers, each of which can be a discrete chip or distributed amongst (and a portion of) a number of different chips. The ASIC 251 may further include a clock 255 (or timer), which may be used to measure an elapsed time since the activation of the analyte sensor device 102.

A memory 253 is also included within ASIC 251 and can be shared by the various functional units present within ASIC 251, or can be distributed amongst two or more of them. Memory 253 can also be a separate chip. Memory 253 is non-transitory and can be volatile and/or non-volatile memory. In this embodiment, ASIC 251 is coupled with power source 260, which can be a coin cell battery or the like. Analog front end 252 interfaces with in vivo analyte sensor 104 and receives measurement data therefrom and outputs the data in digital form to processor 256, which in turn can, in some embodiments, process the digital data in any of the manners described elsewhere herein. This processed data can then be provided to communication circuitry 258 for sending, by way of antenna 261, to the analyte reader device 110/120, for example, where, in some embodiments, further processing may be further performed by the resident software application before displaying the data. The antenna 261 can be configured according to the needs of the application and communication protocol. The antenna 261 can be, for example, a printed circuit board (PCB) trace antenna, a ceramic antenna, or a discrete metallic antenna. The antenna 261 can be configured as a monopole antenna, a dipole antenna, an F-type antenna, a loop antenna, or other types of antennas.

Information may be communicated from the analyte sensor device 102 to a second device (e.g., the analyte reader device 110/120) at the initiative of the analyte sensor device 102 or the analyte reader device 110/120. For example, information can be communicated automatically and/or repeatedly (e.g., continuously) by the analyte sensor device 102 when the analyte information is available, or according to a schedule (e.g., about every 1 minute, about every 5 minutes, about every 10 minutes, or the like), in which case the information can be stored or logged in a memory of the analyte sensor device 102 for later communication. The information can be transmitted from the analyte sensor device 102 in response to receipt of a request by the second device. This request can be an automated request, for example, a request transmitted by the second device according to a schedule, or can be a request generated at the initiative of a user (e.g., an ad hoc or manual request). In some embodiments, a manual request for data is referred to as a "scan" of the analyte sensor device 102 or an "on-demand" data transfer from the analyte sensor device 102. In some embodiments, the second device can transmit a polling signal or data packet to the analyte sensor device 102, and the analyte sensor device 102 can treat each poll (or polls occurring at certain time intervals) as a request for data and, if data is available, then can transmit such data to the second device. In many embodiments, the communication between the analyte sensor device 102 and the second device are secure (e.g., encrypted and/or between authenticated devices), but in some embodiments the data can be transmitted from the analyte sensor device 102 in an unsecured manner, for example, as a broadcast to all listening devices in range.

Different types and/or forms and/or amounts of information may be sent as part of each communication including, but not limited to, one or more of current sensor measurements (e.g., the most recently obtained analyte level information temporally corresponding to the time the reading is initiated), rate of change of the measured metric over a predetermined time period, rate of the rate of change of the metric (acceleration in the rate of change), or historical metric information corresponding to metric information obtained prior to a given reading and stored in a memory of the analyte sensor device 102.

Some or all of real-time, historical, rate of change, and/or rate of rate of change (such as acceleration or deceleration) information may be sent to the analyte reader device 110/120 in a given communication or transmission. In certain embodiments, the type and/or form and/or amount of information sent to the analyte reader device 110/120 may be preprogrammed and/or unchangeable (e.g., preset at manufacturing), or may not be preprogrammed and/or unchangeable so that it may be selectable and/or changeable in the field one or more times (e.g., by activating a switch of the system, etc.). Accordingly, in certain embodiments, the analyte reader device 110/120 can output a current (real-time) sensor-derived analyte value (e.g., in numerical format), a current rate of analyte change (e.g., in the form of an analyte rate indicator such as an arrow pointing in a direction to indicate the current rate), and analyte trend history data based on analyte sensor readings acquired by and stored in memory of the analyte sensor device 102 (e.g., in the form of a graphical trace). Additionally, an on-skin or sensor temperature reading or measurement may be collected by an optional temperature sensor 257. Those readings or measurements can be communicated (either individually or as an aggregated measurement over time) from the analyte sensor device 102 to another device (e.g., the analyte reader device 110/120). The temperature reading or measurement, however, may be used in conjunction with a software routine executed by the analyte reader device 110/120 to correct or compensate the analyte measurement output to the user, instead of or in addition to actually displaying the temperature measurement to the user.

Figure 4:
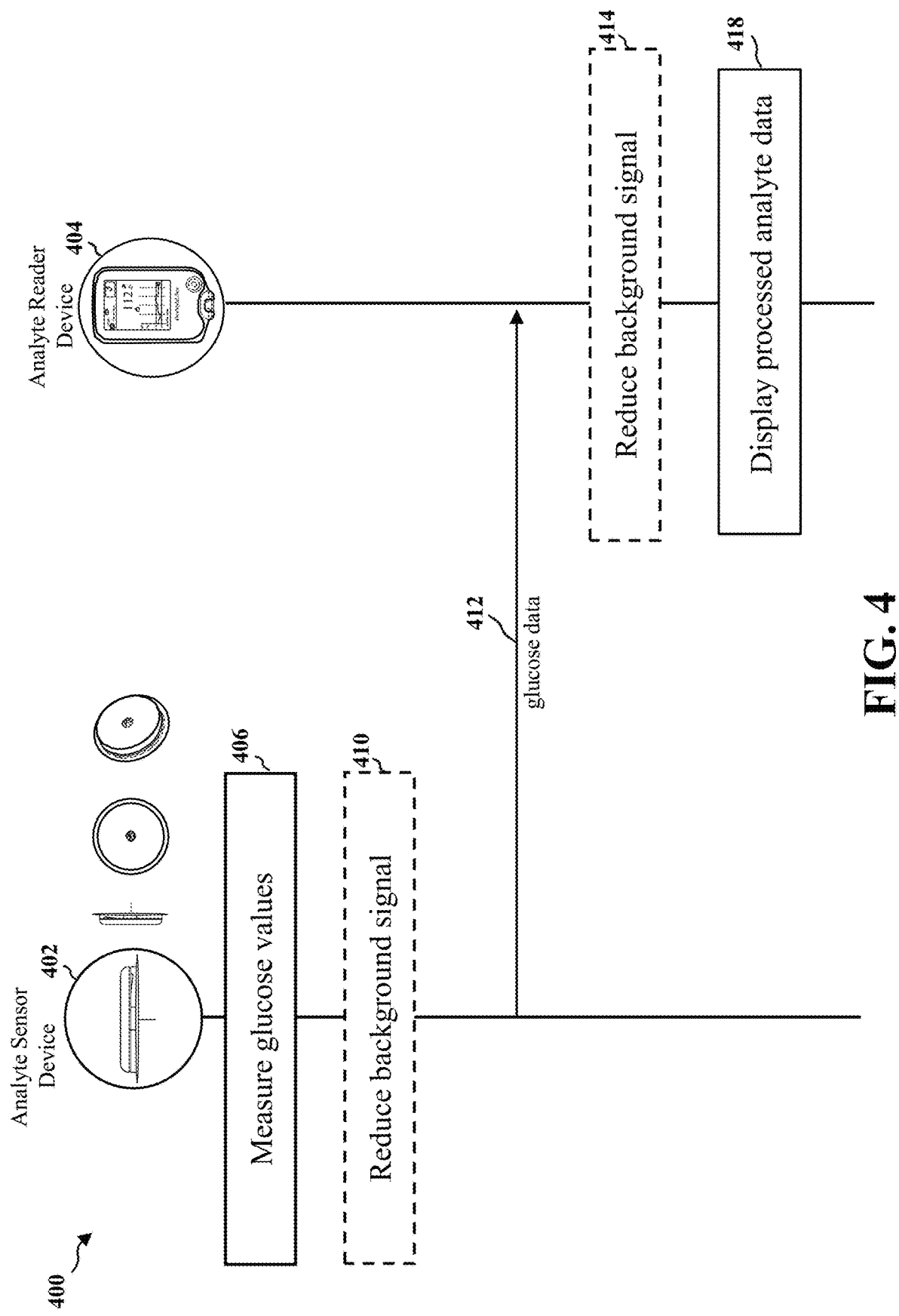
FIG. 4 is a system flow diagram illustrating an analyte sensor device in communication with an analyte reader device according to some embodiments of the present disclosure.

FIG. 4 is a system flow diagram 400 illustrating an analyte sensor device 402 (also 102) in communication with an analyte reader device (also referred to as an analyte display device) 404 (also 110, 120). As illustrated in FIG. 4, at operation 406, the analyte sensor device 402 (e.g., analyte sensor device 102) measures analyte data (e.g., glucose levels/values, peroxide levels/values, ketone levels/values, lactate levels/values, and the like) of a user or patient. In some embodiments, at operation 410, the analyte sensor device 402 may perform one or more processing operations on the data (the measured values) in the glucose data to generate processed data. These processing operations may include operations to reduce a background signal that is present in the analyte data. At operation 412, the analyte sensor device 402 transmits the data (e.g., the processed data in embodiments where some processing is performed by the analyte sensor device 402) to the analyte reader device 404 (e.g., analyte reader device 110/120).

In embodiments where the analyte sensor device 402 performs operation 410, the analyte data transmitted at operation 412 may include both the raw analyte data (e.g., digitized versions of the raw data read from the analyte sensor 104) and the processed analyte data, or may include only the processed analyte data. In embodiments where the analyte sensor device 402 does not perform processing in operation 410, the raw analyte data transmitted at operation 412 includes analyte data that is substantially unmodified (e.g., raw analyte data).

Assuming unmodified data is transmitted at operation 412, in some embodiments of the present disclosure, at operation 414, based on the raw analyte data received from the analyte sensor device 402, the analyte reader device 404 may perform additional processing on the raw analyte data. In addition, in some embodiments of the present disclosure, at operation 414 the analyte reader device 404 may perform additional processing on the processed analyte data received from the analyte sensor device 402 and/or additional processing on raw analyte data received from the analyte sensor device 402. Subsequently, at operation 418, the corrected analyte data (modified by the analyte sensor device 402 and/or the analyte reader device 404) may be displayed by the analyte reader device 404. The processed analyte data displayed by the analyte reader device 404 at operation 418 is more likely to be representative of the correct glucose data than any uncorrected analyte data.

Referring again to operations 410 and 414, the analyte sensor device 402, the analyte reader device 404, or both the analyte sensor device 402 and the analyte reader device 404 may process the analyte data, and either or both of these processing operations may include operations to reduce a background signal and/or detect late sensor attenuation (LSA). Based on the reduction of the background signal, the analyte sensor device 402, the analyte reader device 404, or both the analyte sensor device 402 and the analyte reader device 404 may improve the accuracy of the analyte values output and displayed by the analyte reader device 404, and/or improve the accuracy of analyte values used to control, for example, a drug delivery pump. Based on the detection of LSA by the analyte sensor device 402 and/or the analyte reader device 404, the analyte sensor device 402, the analyte reader device 404, or both the analyte sensor device 402 and the analyte reader device 404 may mitigate the erroneous detection of low glucose during LSA. As discussed above, other combinations are possible, as each of the analyte sensor device 402 and the analyte reader device 404 may perform one or more of the operations including the background signal removal and the LSA detection. Processes for background signal removal and LSA detection according to some embodiments of the present disclosure will be presented in more detail below.

Factors Impacting Accuracy of Analyte Sensors

The accuracy of analyte sensors is influenced by a variety of different factors. As discussed in more detail below, aspects of embodiments of the present disclosure relate, in particular, to improving the accuracy of analyte sensors by detecting late sensor attenuation (LSA) and reducing a background signal.

Although rare, error due to late sensor attenuation (LSA) can affect low-end accuracy metrics. In addition, the presence of background current may impact low-end accuracy. Some glucose sensor systems employ a combination of factory calibration and algorithm to detect LSA, correct LSA, and adjust the output map to minimize the impact of LSA and background current on accuracy. A more direct way to measure LSA and background current can improve the efficacy of their mitigation, thereby further improving sensor accuracy.

Figure 5:
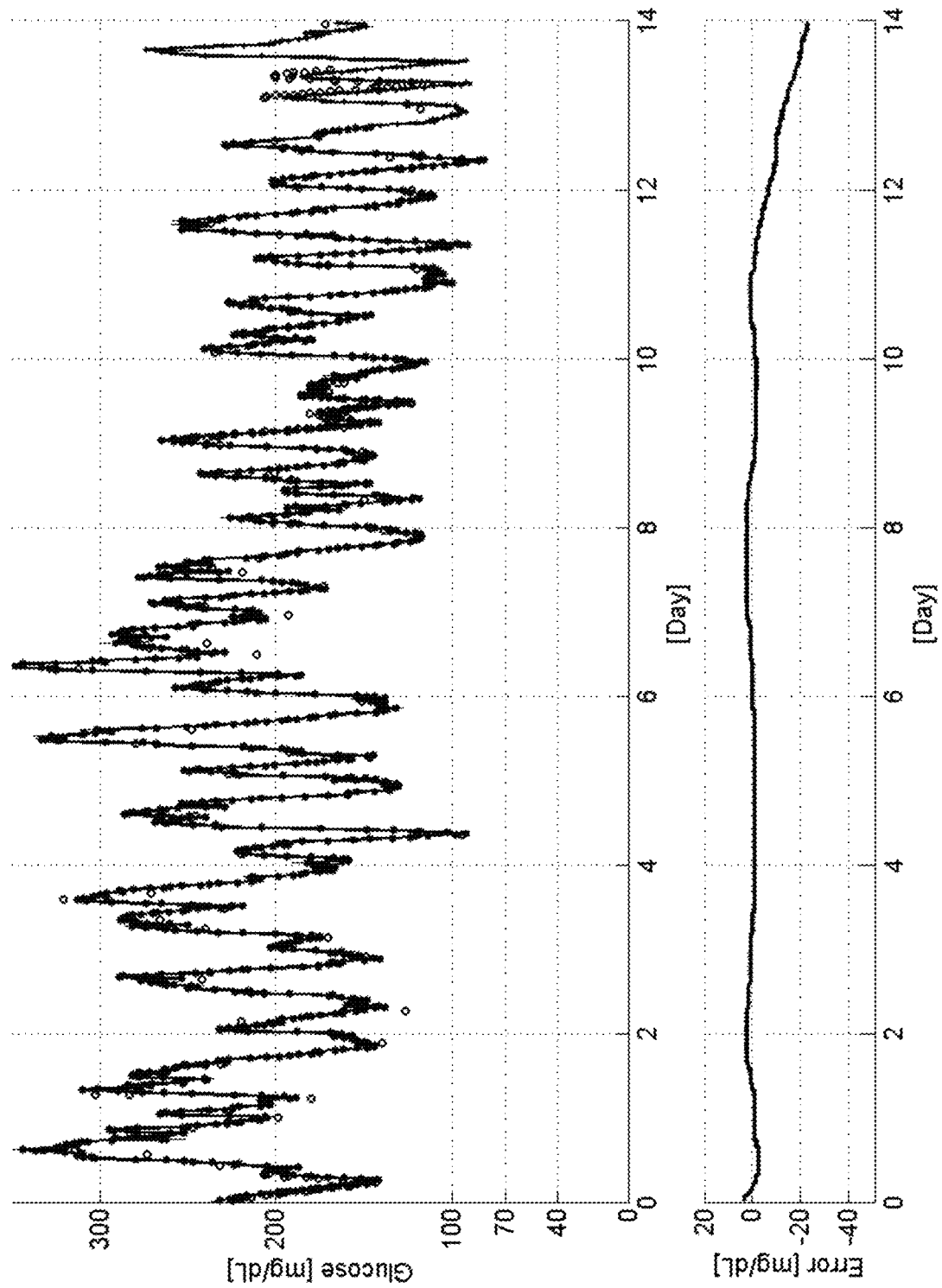
FIG. 5 is a graph depicting the effect of late sensor attenuation (LSA) in an analyte sensor over the course of 14 days.

FIG. 5 is a graph depicting the effect of late sensor attenuation (LSA) in an analyte sensor over the course of 14 days. As noted above, for a 14-day analyte sensor wearing period (or period over which a patient wears the sensor), a minority of the analyte sensors are observed to experience a generally persistent and steady degradation in the latter part of the period. An example is shown in FIG. 5, where the top plot shows a line indicating glucose levels as measured by the implanted analyte sensor over the course of 14 days along with, for reference, blood glucose (BG) measurements, taken at corresponding times, shown with dots. In the example shown in FIG. 5, sensor glucose readings begin to trend lower after 7 days, but remain consistent relative to the reference BG readings. This is evident in the smoothed error plot comparing sensor glucose readings to BG readings where the error remains around 0 past 7 days up until around 11 days. However, in this sensor, late in the wear period, at around the 12th day, the error starts trending downwards (the magnitude of the error increases), indicating that the sensor glucose readings are beginning to under-read compared to the BG readings. This LSA can therefore cause inaccurate readings, either by delaying detection of high glucose levels, or by indicating that glucose levels are low when the glucose levels are within an acceptable range.

Background current is another source of error. As discussed above, a system for measuring the output of an analyte sensor is typically configured so that the measured current (i) is linearly correlated with the analyte concentration (C) of the analyte or analytes of interest and can be characterized as:

$$i = m*C + b$$

where m is the signal sensitivity that is driven by the performance of detection scheme based on the biochemical reactions for detecting the analyte or analytes of interest. The background current or background offset b varies greatly over time, and can also be seen as a noise parameter. Accordingly, the presence of the background offset b may reduce the signal-to-noise ratio (SNR) of the detection system, especially in cases where the analyte of interest (or target analyte) has a relatively low signal in comparison to the background offset b (e.g., where the desired signal m*C is the same order of magnitude as the background offset b).

The background offset b is caused, in part, by interference substances in vivo are those endogenous or exogenous compounds that could easily be oxidized (or reduced) at voltages at or below the controlled voltage of the sensor (the controlled voltage of the sensor may correspond to the oxidation or reduction potential of the target analytes, which may exceed the oxidation or reduction potentials of interference substances). One common mitigation strategy is to reduce the controlled voltage in order to minimize the interference oxidation signal. However, as the controlled voltage is reduced, the detection schemes of biochemical reactions will occur at a significantly slower rate or even stop, thereby setting a lower limit to the controlled voltage. Another mitigation strategy is to use permselective membranes to block the interference compounds from reaching the electrode surface and reacting there. However, adding additional membranes to the sensor construction typically increases the complexity of the production process. Furthermore, permselective membranes can generally block only a few common compounds, and may not be able to provide perfect selectivity to allow only the analytes of interest to pass through the membrane. Therefore, while these mitigation strategies can reduce the background offset b, applying further mitigation strategies can further improve the accuracy of the resulting signal.

Some embodiments of the present disclosure relate to reducing the background current (or the background offset b) by computing an offset signal and subtracting the offset signal from the measured data in order to mitigate the impact of this background noise and to improve the signal-to-noise ratio of the measurement. Some embodiments of the present disclosure relate to performing the subtraction or reduction of background current during signal processing (e.g., when processing the data by the analyte sensor device 402 and/or the analyte reader device 404), without the need to further modify the analyte sensor device 402 with additional membrane layers or changing the controlled voltage of the sensor. As noted above, background reduction is especially beneficial when measuring target analyte concentrations in a lower end of a working range, which may have relatively low signal-to-noise ratios without further processing. Nevertheless, analytes with higher concentrations, such as glucose, will also benefit from background reduction in accordance with embodiments of the present disclosure.

Figure 6:
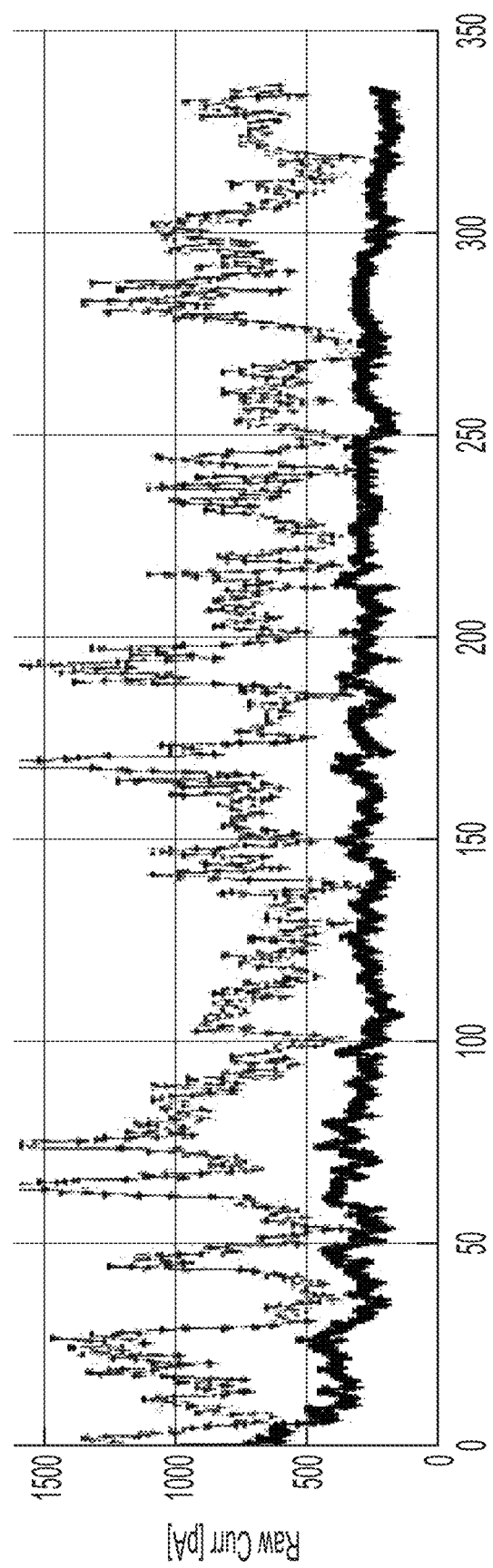
FIG. 6 is a graph depicting a measured raw current through an analyte sensor and a separate background sensor.

As one example, FIG. 6 is a graph depicting a measured raw current through an analyte sensor and a separate background sensor. As shown in FIG. 6, the current detected by the background sensor is similar in magnitude to the current detected by the analyte sensor (e.g., the analyte signal and the background signal are approximately the same order of magnitude), and therefore a significant component of the output of the analyte sensor is a background signal corresponding to the output of the background sensor.

Figure 7:
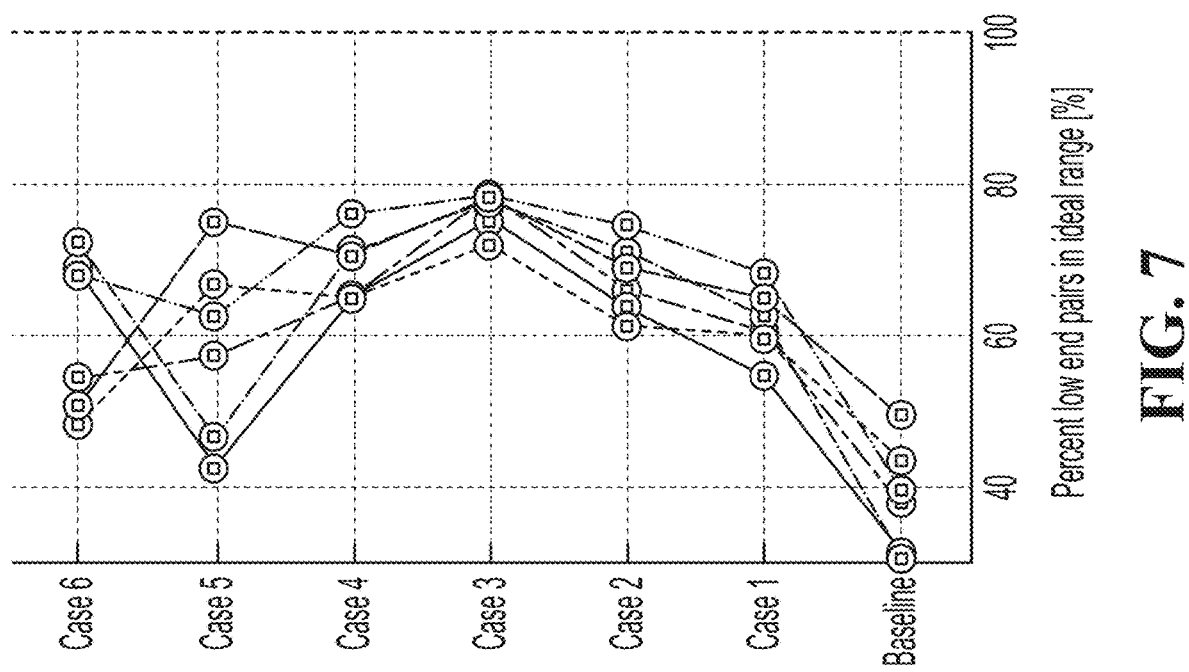
FIG. 7 depicts the results of several sensor studies performed using in silico models (e.g., mathematical simulations) to examine the impact of various factors on a low-end accuracy metric.

Additional factors that can affect the performance of an analyte sensor such as a glucose sensor include: system faults (like LSA), time lag between analyte levels in blood and versus analyte levels in interstitial fluid (ISF), sensor calibration offset, and sensor calibration slope. FIG. 7 depicts the results of several sensor studies performed using in silico models (e.g., mathematical simulations) to examine the impact of these various factors on a low-end accuracy metric (e.g., accuracy at a low end of the concentration range, where the signal-to-noise ratio may be the lowest), with 100% meaning all datapoints falling within a threshold agreement range with reference values, and 0% meaning none of the datapoints falling within the threshold agreement range. In the Baseline case, the in silico models of each study represent different extents of these factors. Case 1 simulates the removal of the effect of system faults (e.g., LSA). Case 2 simulates the removal of system faults and the removal of the time lag between the blood analyte levels and interstitial fluid analyte levels. Cases 3 through 6 further build upon Case 2: Case 3 further simulates the removal of offset variability; Case 4 further simulates the removal of slope variability; Case 5 simulates the removal of mean offset; and Case 6 simulates the removal of mean slope error. Of these cases, Case 3 appears to provide the greatest improvement across all of the six different studies. Accordingly, being able to detect background current will likely reduce offset variability.

Reducing Global Background Current

Some aspects of embodiments of the present disclosure relate to reducing a global background current to improve sensor measurement accuracy. These embodiments of the present disclosure may be applied to all electrochemical biosensor applications, regardless of the target analyte concentration range, although embodiments of the present disclosure may provide more noticeable improvement at the lower end of analyte concentration (such as peroxide, ketone, glucose, lactate, etc.).

As noted above with respect to FIG. 6, the signal (e.g., current) detected by the background sensor is similar in magnitude to the current detected by the analyte sensor (e.g., the analyte signal and the background signal are approximately the same order of magnitude), and therefore a significant component of the output of the analyte sensor is a background signal corresponding to the output of the background sensor. Removing or reducing this background signal from the output of an analyte sensor (e.g., a peroxide sensor, a glucose sensor, etc.) would therefore improve the accuracy of the analyte sensor.

In general, the background current level varies over time and is not generally flat throughout the wear period of the analyte sensor. For example, in the particular example shown in FIG. 6, the background current level varied with time, and slowly came down during early days of wear (an effect referred to as "Run-In"), then settled at a fairly high offset value (approximately 200 pA).

Figure 8:
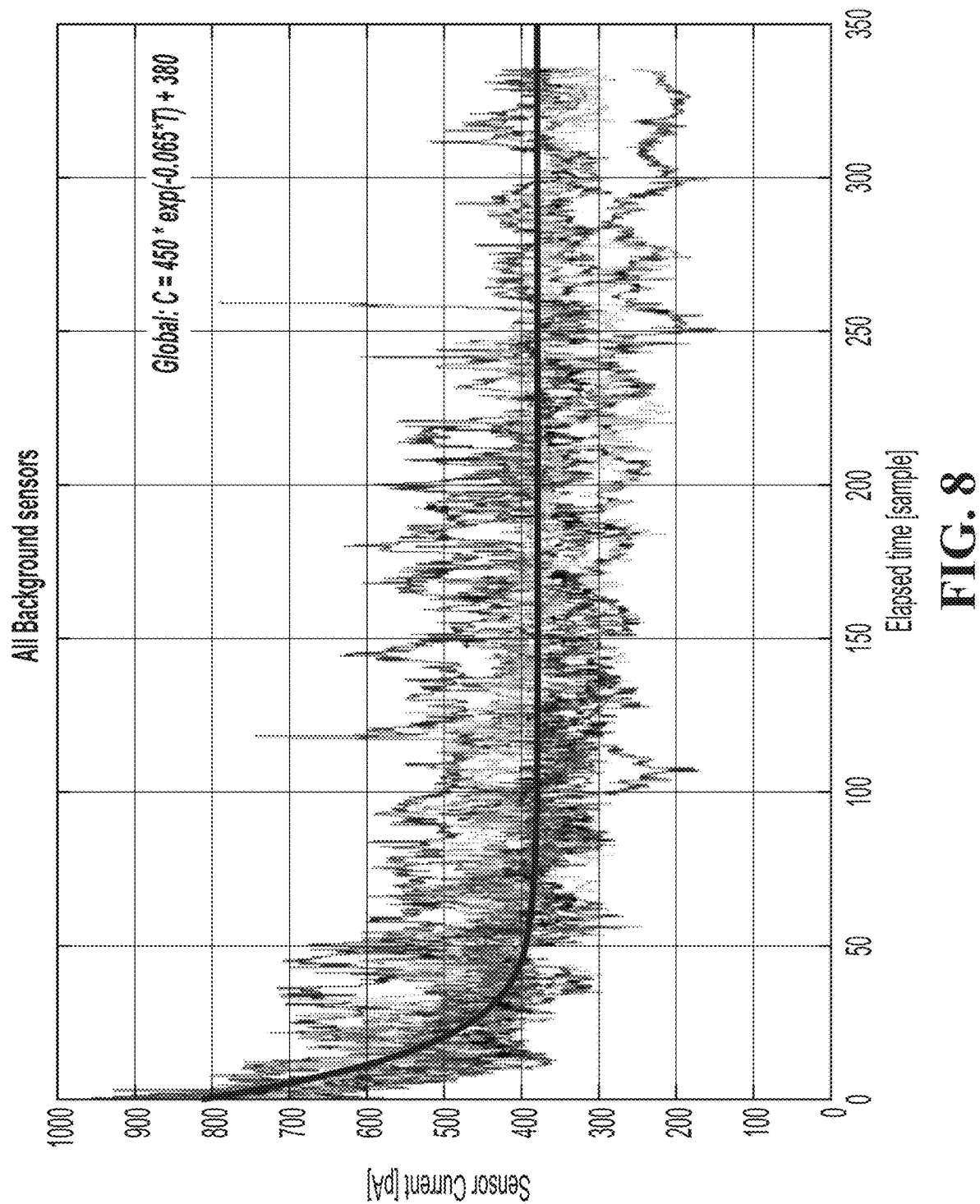
FIG. 8 is a graph depicting the outputs of several different background sensors as measured from several different subjects.

FIG. 8 is a graph depicting the outputs of several different background sensors as measured from several different subjects. As shown in FIG. 8, the background current profile across subject/wear is similar, although not identical. For example, all subjects showed an initial high current level of approximately 800 pA that gradually came down over the first 50 hours (approximately two days) of the wear period and remained at a relatively stable level over the remaining time of the wear period. Accordingly, some aspects of embodiments of the present disclosure relate to computing a Global background correction across subjects. While embodiments of the present disclosure are not limited thereto, for the particular data set shown in FIG. 8, a Global Time-Varying Subtraction model (or statistical model) was defined based on a combination of the background signals measured from the different subjects as Background Current, in pA, as:

$$C=450*\exp(-0.065*T)+380$$

where T is time in hours elapsed since sensor activation.

Figure 9A:
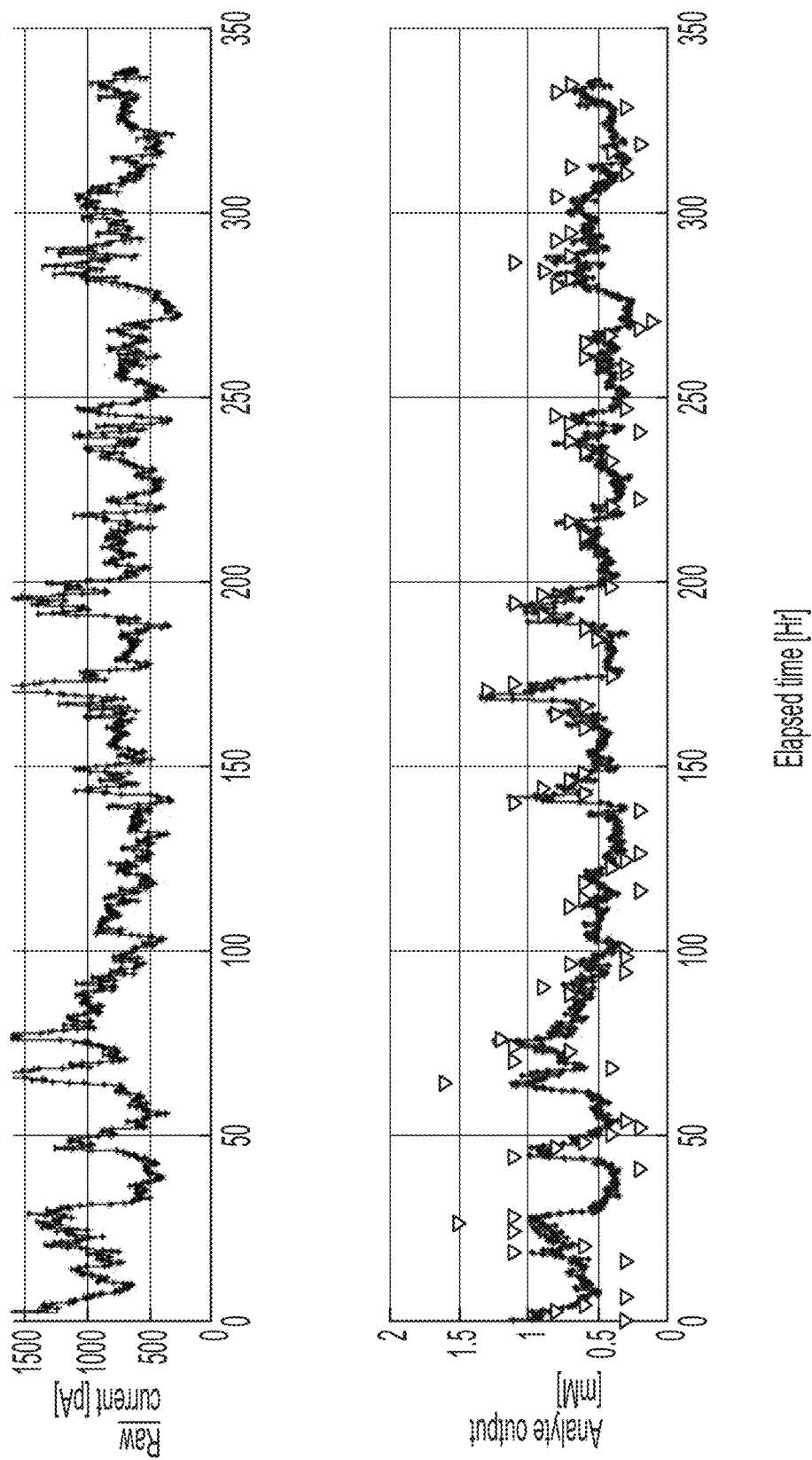
FIGS. 9A and 9B are graphs depicting the sensor traces, respectively, before and after subtracting a global background current in accordance with some embodiments of the present disclosure.
Figure 9B:
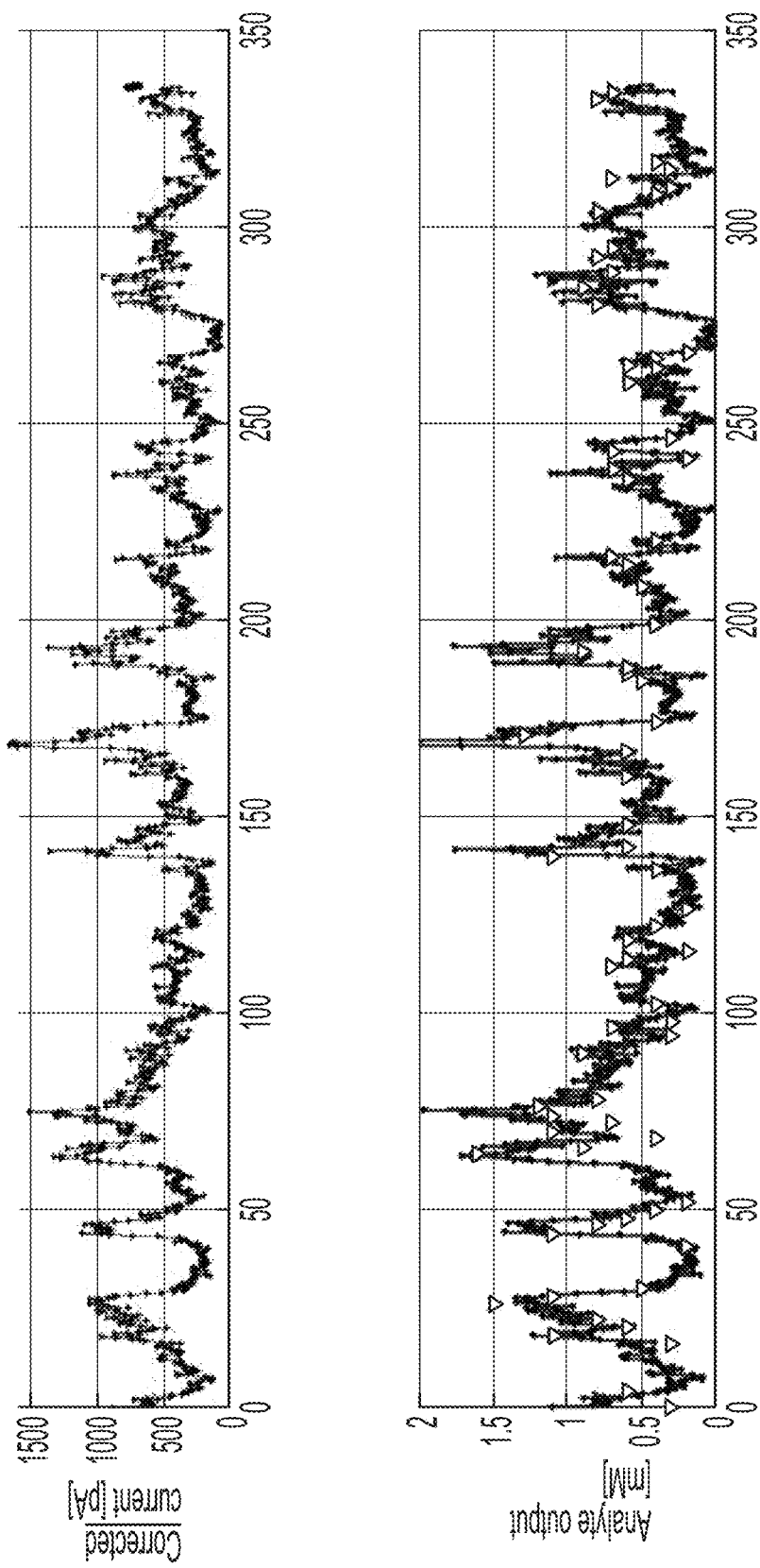

FIGS. 9A and 9B are graphs depicting the sensor traces, respectively, before and after subtracting a global background current in accordance with some embodiments of the present disclosure. In more detail, FIGS. 9A and 9B each include two subplots which, from top to bottom, correspond to a sensor current in pico amps (pA) and a molar concentration of analyte based on sensor data in millimolar (mM). In FIG. 9A, the sensor current corresponds to a raw sensor current, and in FIG. 9B, the sensor current corresponds to a corrected sensor current after subtracting a global background current. The subplots showing the computed molar concentration of analyte based on interstitial fluid sensor data also depict reference analyte levels with triangles (e.g., computed based on analyzing blood samples).

As shown in FIGS. 9A and 9B, the computed molar concentrations of analyte track the analyte references (triangles) much more closely after removing the background current, as shown in FIG. 9B, than without removing the background current, as shown in FIG. 9A. In other words, the computed molar concentrations are much closer to the references in FIG. 9B than in FIG. 9A, especially in the early days of wear (e.g., the first 100 hours of wear).

Figure 10B:
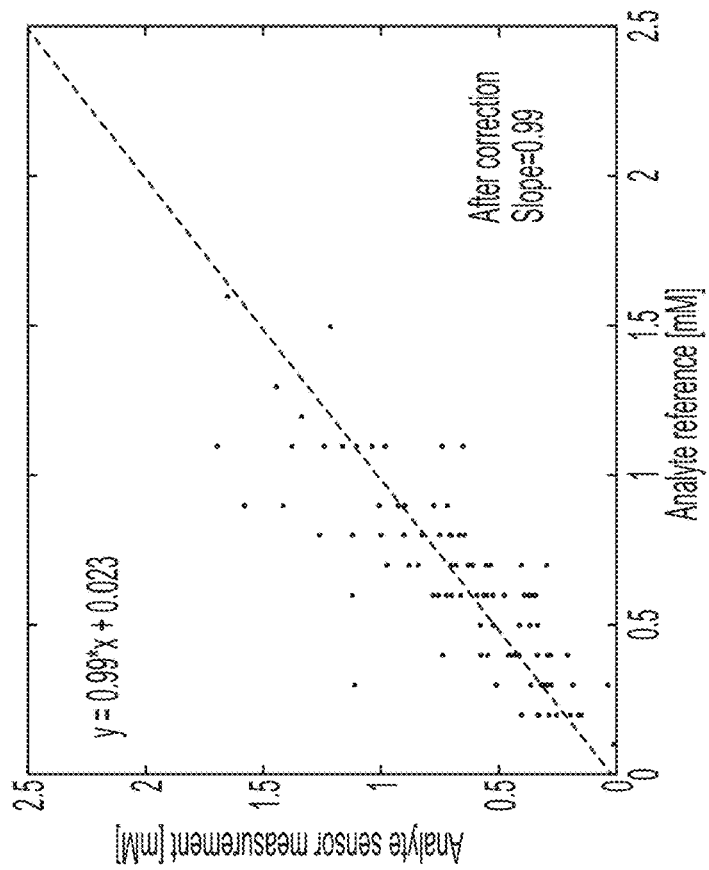
FIGS. 10A and 10B are graphs depicting the calculated analyte concentration measurements calculated based on interstitial fluid sensor data against analyte reference values measured at corresponding times.
Figure 10A:
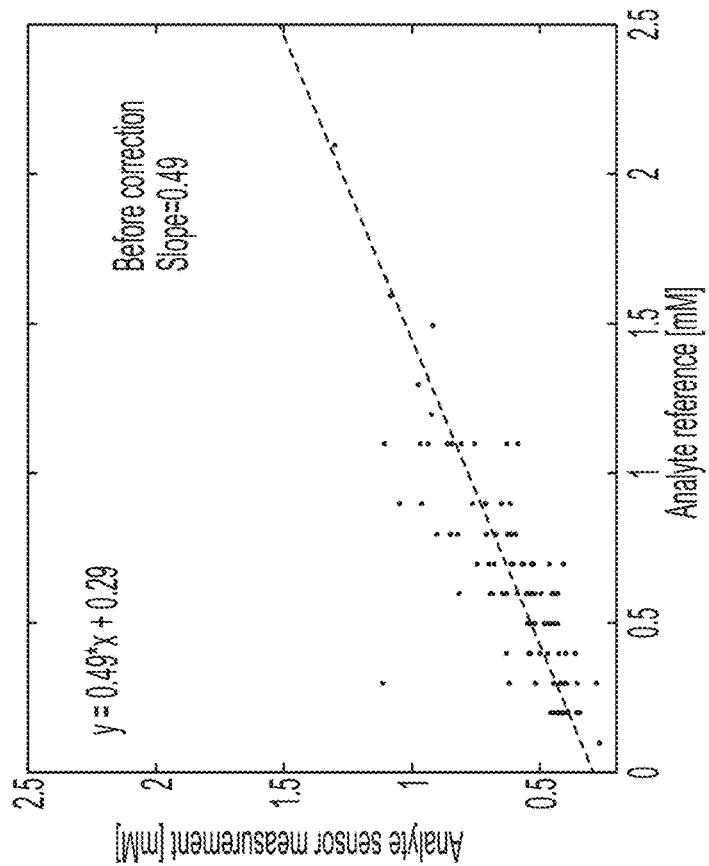

FIGS. 10A and 10B are graphs depicting the analyte concentration measurements calculated based on interstitial fluid sensor data against analyte reference values measured at corresponding times. In an ideal case, the analyte concentration measurements based on ISF data would be identical to the reference data, and therefore the graph would have a slope of 1 and a y-intercept or bias of 0. As shown in FIG. 10A, in the particular case shown in FIG. 9A, before subtracting or removing a global background current, the slope of the line fit to the data is 0.49 and the y-intercept is 0.29. FIG. 10B shows that, in the particular case shown in FIG. 9B, after subtracting the global background current, the slope of the line fit to the data is 0.99 and the y-intercept is 0.023, thereby reducing the background offset b by an order of magnitude (from 0.29 to 0.023) and approximately doubling the signal sensitivity m (from 0.49 to 0.99).

As such, aspects of embodiments of the present disclosure relate to improving the accuracy of an analyte sensor by reducing a background current, such as by subtracting a global background current.

Figure 11:
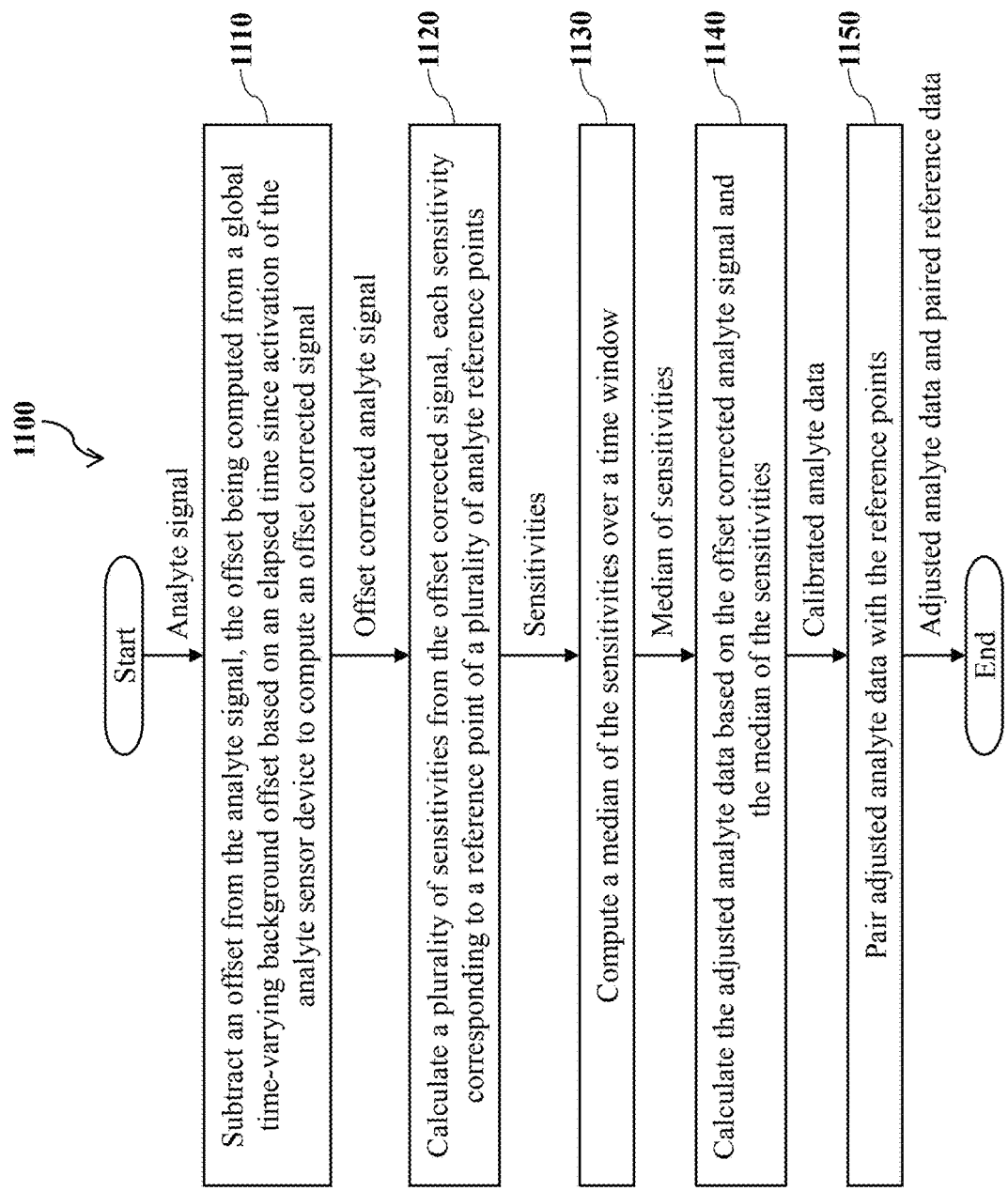
FIG. 11 is a flowchart of a method for reducing a background current according to one embodiment of the present disclosure.

FIG. 11 is a flowchart of a method 1100 for reducing a background current according to one embodiment of the present disclosure. In various embodiments of the present disclosure, the operations depicted in FIG. 11 may be distributed between the various components of the analyte monitoring system 100. For example, some or all operations may be performed by the analyte sensor device 102 or 402, and some or all operations may be performed by the analyte reader device 110/120 or 404. In the below discussion, these will be referred to collectively as the analyte monitoring system 100.

Referring to FIG. 11, according to one embodiment of the present disclosure, an analyte signal is received from an analyte sensor (e.g., measured by an analyte sensor 104). As noted above, the analyte may be, for example, ketone, lactate, or glucose, although embodiments of the present disclosure are not limited thereto. The analyte signal may be a digital signal, e.g., after being processed by the analog front end 252. In addition, the analyte monitoring system 100 may temperature-correct the analyte signal, e.g., adjust or modify the analyte signal to compensate for greater reactivity of the analyte with the electrode at higher temperatures (thereby causing higher currents at the same analyte concentrations as well as higher background current measurements). The temperature correction may be performed based on a measured temperature at a time corresponding to the digital signal. The measured temperature may be collected by, for example, the temperature sensor 257, which is configured to measure the temperature at a location local to the analyte sensor 104, such as skin surface temperature (TpSk) under the analyte sensor device 102 (e.g., at or adjacent to the adhesive patch 105). In various embodiments of the present disclosure, the measured temperature is averaged or smoothed over a time window. According to some embodiments of the present disclosure, the temperature correction applied to both the background signal and the analyte signal is approximately 6.5% per degree Celsius.

At operation 1110, the analyte monitoring system 100 calculates an offset corrected analyte signal by subtracting an offset from each analyte sensor (in the case of multiple analyte sensors and/or one or more background sensors). The offset may be calculated based on, for example, a global time-varying background offset (as discussed above) computed based on a combination of sensor readings from different sensors and different users, such as $C=450*\exp(-0.065*T)+380$, based on an individual background offset (e.g., a background offset computed based on measurements specific to the particular patient monitored by the analyte monitoring system 100, based on: a global time-invariant offset; an individual time-invariant offset; and/or combinations thereof, as will be discussed in more detail below.)

In operation 1120, the analyte monitoring system 100 calculates a sensitivity (e.g., m in the relationship $i=m*C+b$ between the sensor analyte current and the analyte concentration C) at each analyte reference point from the corrected analyte signal (where b is assumed to be zero, due to the correction of the analyte signal by subtracting the background offset at operation 1110). The reference points may correspond to, for example, analyte concentrations measured using a different technique, such as using a finger stick (FS) to measure analyte levels in blood.

In operation 1130, the analyte monitoring system 100 computes a median of the sensitivities calculated in operation 1120 over a time window (e.g., 72 hours to 168 hours) for each sensor (which may be referred to herein the Median Sensitivity for each sensor), and in operation 1140 the analyte monitoring system calculates the analyte data from the offset corrected-current i, based on the median of the sensitivities. The Median Sensitivity is a characterization of the in vivo sensitivity for that sensor for the entire sensor life, where one in vivo sensitivity is computed for each sensor. In some embodiments, the Median Sensitivity is calculated over a time window that corresponds to the period that is observed to be the most stable among sensors of the same type. After computing the Median Sensitivity for each sensor, the analyte results for the entire sensor life (e.g., 0 to 14 days, not just the time window, such as 72 hours to 168 hours) are calculated using this in vivo Median Sensitivity.

In some embodiments, in operation 1150, the analyte monitoring system pairs the calculated analyte data with the reference points, which allows further downstream assessment for system performance, such as sensor accuracy, precision, stability and safety. The reference points correspond to blood analyte values measured from an accurate system, which are taken as the true values. These reference points are used to determine the sensitivity of each sensor by matching the calculated analyte data to the reference data. By doing so, the calculated analyte data can be mapped to analyte values without needing to perform a separate reference measurement. The system is taken as being more accurate when the sensor results are closer to the reference data.

In addition to computing a global time-varying subtraction model, some aspects of embodiments of the present disclosure relate to computing additional or alternative background subtraction models. Some aspects of embodiments of the present disclosure relate to computing an individual time-varying offset for each particular patient (or subject) and/or for each particular wear of a device. Systems and methods for generating an individual time-varying subtraction model are described in more detail below.

In addition, some aspects of embodiments of the present disclosure relate to using a fixed offset (or time-invariant offset) rather than a time-varying offset. Such embodiments may be more applicable in environments where the analyte monitoring system lacks the capability to perform time-varying calculations (e.g., due to the lack of a clock or timer), or circumstances where a time-varying calculation may not be necessary (e.g., due to the availability of other correction factors, or due to variance, or lack thereof, in background signals among subjects and sensor lots).

In some embodiments of the present disclosure, an offset is calculated based on a combination of global and individual offsets. For example, the offset applied to correct the analyte signal in operation 1110 may be computed based on a linear combination of a global offset and an individual offset.

The global and individual offsets, whether time-varying or time-invariant, may be computed based on historical data or may be calculated based on sensor readings during wear (e.g., in real time).

For example, in the case where a global offset (time-varying or time-invariant) is calculated based on historical data, the global offset may be generated by combining background offsets (e.g., computing an average such as a mean) from a plurality of different wears of different sensors worn by several different subjects. In more detail, when computing a time-varying offset, the global offset at each point in time is the average (e.g., mean) of all of the background offsets from the different wears. When computing a time-invariant (or fixed) offset, each individual background offset may be averaged (e.g., a mean or a mean of a low-pass filtered signal) over the length of the wear (e.g., across the 14-day wear period), and the individual fixed background offsets from the individuals may then be averaged (e.g., mean) to compute a global background offset.

In some embodiments of the present disclosure, different global offsets may be calculated for different clusters of subjects, where the subjects may be clustered in accordance with similarity of background offset or based on similarity of other physiological characteristics of the patients or subjects. In some embodiments of the present disclosure, the clustering is performed using an unsupervised machine learning algorithm, such as k-means clustering, where k is the number of clusters. In embodiments in which there are multiple global offsets defined for different clusters of patients, a global offset may be selected for use with a particular patient by identifying a cluster most similar to the patient (e.g., identifying which cluster the patient would be clustered into by the clustering algorithm) and applying the global offset associated with the identified most similar cluster.

Likewise, an individual offset for a particular patient may be calculated using historical data from the individual patient's prior wears. In a manner similar to that described above for computing a global average offset across multiple wears from multiple patients, some aspects of embodiments of the present disclosure relate to computing an individual offset (fixed or time-varying) for a particular patient from multiple background offsets measured from the same patient over several different wears over time. Accordingly, embodiments of the present disclosure allow an individual time-varying offset to be tailored to the particular background offset characteristics of a patient.

When a patient first starts using an analyte monitoring system according to embodiments of the present disclosure, there may be a lack of data for generating an individual offset based on prior wears. Accordingly, a global offset, as discussed above, may initially be applied, where individual offsets may be applied in later wears of an analyte sensor once sufficient individual historical background offset data has been collected. During an intermediate time, when some individual background offset data has been collected (but not sufficient information to develop a confident individual model), a weighted combination of global and individual offsets may be applied, as discussed above.

Measuring an Individual Background Offset

Some aspects of embodiments of the present disclosure relate to systems and methods for measuring an individual background offset. In more detail, some aspects of embodiments of the present disclosure relate to an analyte sensor or analyte sensor tail having multiple sensor channels.

Figure 12:
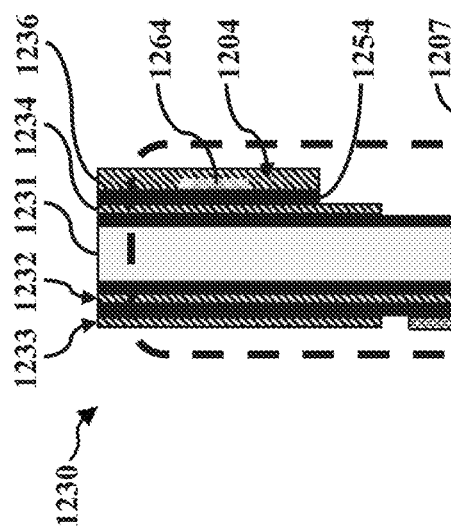
FIG. 12 is a schematic diagram of a multi-channel analyte sensor according to one embodiment of the present disclosure.
Figure 13A:
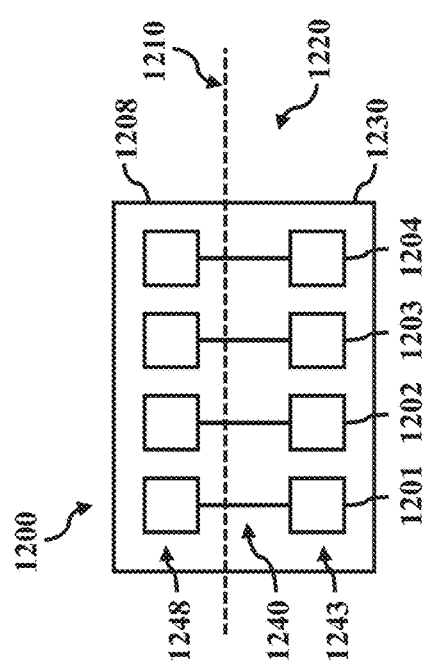
FIGS. 13A and 13B show a perspective view and a cross sectional view, respectively, of the multi-channel analyte sensor of FIG. 12 according to one embodiment of the present disclosure.
Figure 13B:
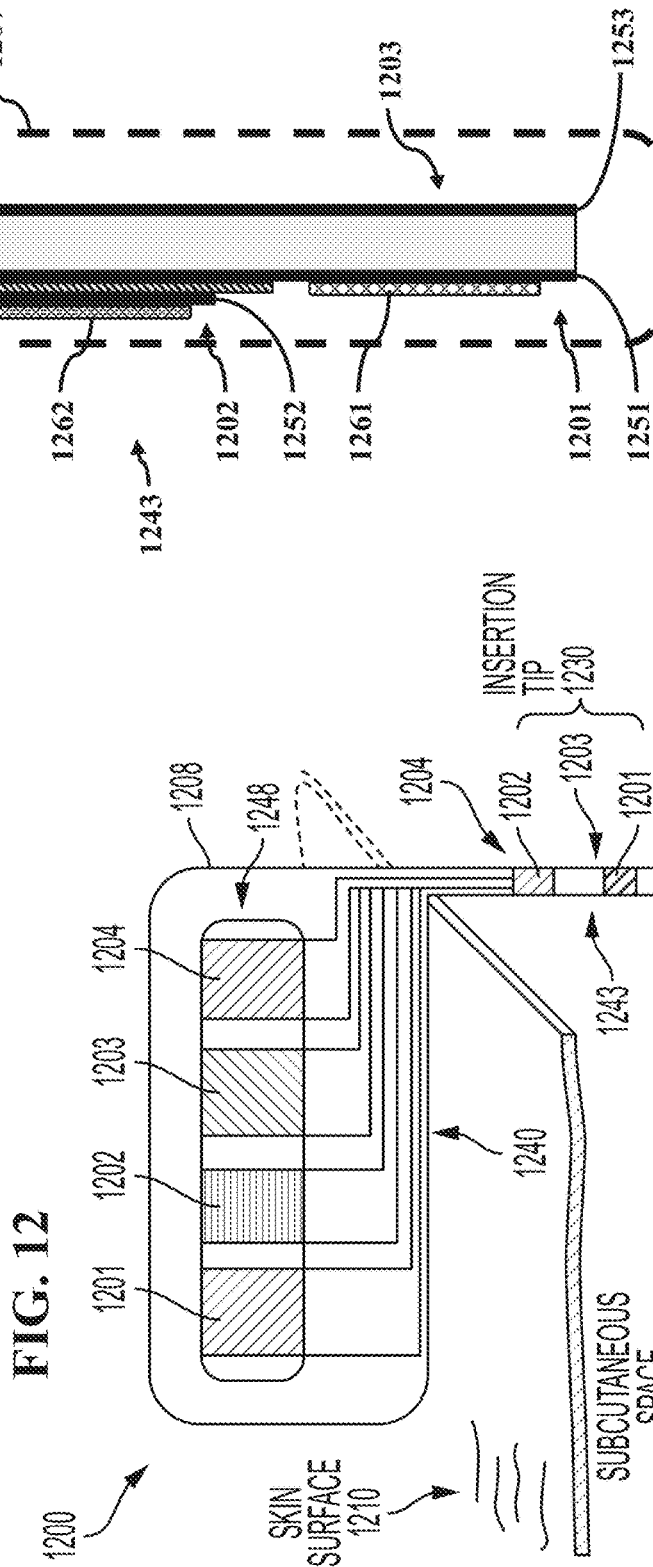

FIG. 12 is a schematic diagram of a multi-channel analyte sensor according to one embodiment of the present disclosure. FIGS. 13A and 13B show a perspective view and a cross sectional view, respectively, of the multi-channel analyte sensor of FIG. 12 according to one embodiment of the present disclosure.

FIG. 12 schematically shows an embodiment of an analyte sensor in accordance with the present disclosure. The sensor 1200 includes electrodes 1201, 1202, 1203, and 1204 on a base or external portion 1208 and an insertion tip or internal portion 1230. The sensor may be wholly implantable in a user or may be configured so that only a portion 1230 is positioned within (internal) a user and another portion 1208 is positioned outside of (external) a user or patient. For example, the sensor 1200 may include an external portion 1208 positionable above a surface of the skin 1210, and an internal portion 1230 positioned below the skin (subcutaneous space 1220). In such embodiments, the base portion or external portion 1208 may include contacts (connected to respective electrodes of the internal portion 1230 by traces 1240) to connect to another device also external to the user, for example, a transmitter unit. For example, in some embodiments, the sensor 1200 corresponds to the analyte sensor 104 described above, and the other device external to the user corresponds to the sensor electronics 250. While the embodiment of FIG. 4 shows four electrodes 1201, 1202, 1203, and 1204 side-by-side on the same surface of base 1208, other configurations are contemplated, e.g., fewer or greater electrodes, some or all electrodes on different surfaces of the base or present on another base, some or all electrodes stacked together, electrodes of differing materials and dimensions, etc.

FIG. 13A shows a perspective view of an embodiment of an electrochemical analyte sensor 1200 having a first portion 1208 (which in this embodiment may be characterized as a major portion) positionable above a surface of the skin 1210, and a second portion (which in this embodiment may be characterized as a minor portion) that includes an insertion tip 1230 positionable below the skin, e.g., penetrating through the skin and into, e.g., the subcutaneous space 1220, in contact with the user's biofluid such as interstitial fluid. The insertion tip 1230 extends from the base 1208 of the electrochemical analyte sensor 1200. Contact portions 1248 of the first working electrode 1201, the second working electrode 1202, the counter electrode 1203, and the reference electrode 1204 are positioned on the portion of the sensor 1200 situated above the skin surface 1210. Subcutaneous portions 1243 of the first working electrode 1201, the second working electrode 1202, the counter electrode 1203, and the reference electrode 1204 are also shown at the second section and particularly at the insertion tip 1230. Traces 1240 may be provided from the electrode at the tip to the contact, as shown in FIG. 13A. It is to be understood that greater or fewer electrodes may be provided on a sensor. For example, a sensor may include more than one working electrode, and/or the counter and reference electrodes may be a single counter/reference electrode, etc.

FIG. 13B shows a cross sectional view of a portion of the sensor 1200 of FIG. 13A, in particular a cross sectional view of a portion of the insertion tip 1230. The electrodes 1201, 1202, 1203, and 1204 of the sensor 1200 as well as the substrate 1231 and the dielectric layers 1232 are provided in a layered configuration or construction. For example, as shown in FIG. 13B, in one aspect, the sensor 1200 (such as the analyte sensor 104 of FIG. 1) includes a substrate layer 1231 and a first conducting layer 1251 (including, for example, carbon, gold, etc.) disposed on at least a portion of the substrate layer 1231, where the first conducting layer 1251 provides a portion of the first working electrode 1201. Also shown is a first sensing layer 1261 disposed on at least a portion of the first conducting layer 1251.

Still referring to FIG. 13B, a first insulation layer such as a first dielectric layer 1232 is disposed or layered on at least a portion of the first conducting layer 1251, and, further, a second conducting layer 1252 may be disposed or stacked on top of at least a portion of the first insulation layer (or dielectric layer) 1232. Like the first conducting layer 1251, the second conducting layer 1252 may also be carbon, gold, etc. As shown in FIG. 13B, the second conducting layer 1252 may provide the second working electrode 1202. A second sensing layer 1262 may be disposed on at least a portion of the second conducting layer 1252. Furthermore, a second insulation layer 1233 may be disposed on the second conducting layer 1252.

In the embodiment shown in FIG. 13B, a third conducting layer 1253 (including, for example, carbon, gold, etc.) is disposed on a portion of the substrate layer 1231 opposite the first conducting layer 1251 (e.g., on the other side of the substrate layer 1231 along an axis perpendicular or normal to a plane of the substrate layer 1231). The third conducting layer 1253 may provide the counter electrode 1203. A third insulation layer 1234 may be disposed on the third conducting layer 1253.

A fourth conducting layer 1254 may be disposed on the third conducting layer. As shown in FIG. 13B, the fourth conducting layer 1254 may provide the reference electrode 1204 and, in one aspect, may include a layer 1264 of silver/silver chloride (Ag/AgCl), gold, etc., and a fourth insulation layer 1236 may be disposed on the fourth conducting layer 1254 to cover the layer 1264.

In this manner, the sensor 1200 may be layered such that at least a portion of each of the conducting layers is separated by a respective insulation layer (for example, a dielectric layer).

FIGS. 13A and 13B show embodiments in which the layers have different lengths. However, embodiments of the present disclosure are not limited thereto. For example, in some embodiments, some or all of the layers may have the same or different lengths and/or widths.

In certain embodiments, some or all of the electrodes 1201, 1202, 1203, and 1204 may be provided on different sides of the substrate 1231 in the layered construction as described above, or, alternatively, may be provided on the same side of the substrate 1231 either in a staggered depth arrangement as shown and/or in a co-planar manner such that two or more electrodes may be positioned on the same plane (e.g., side-by-side (e.g., parallel) or angled relative to each other) on the substrate 1231. For example, co-planar electrodes may include a suitable spacing therebetween and/or include dielectric material or insulation material disposed between the conducting layers/electrodes.

As shown in FIG. 13B, in some embodiments, the electrodes 1201, 1202, 1203, and 1204 are disposed on different sides of the substrate 1231. In such embodiments, contact pads may be on the same or different sides of the substrate. For example, an electrode may be on a first side and its respective contact may be on a second side, e.g., a trace connecting the electrode and the contact may traverse through the substrate (e.g., using a via or hole in the substrate 1231).

Figure 13C:
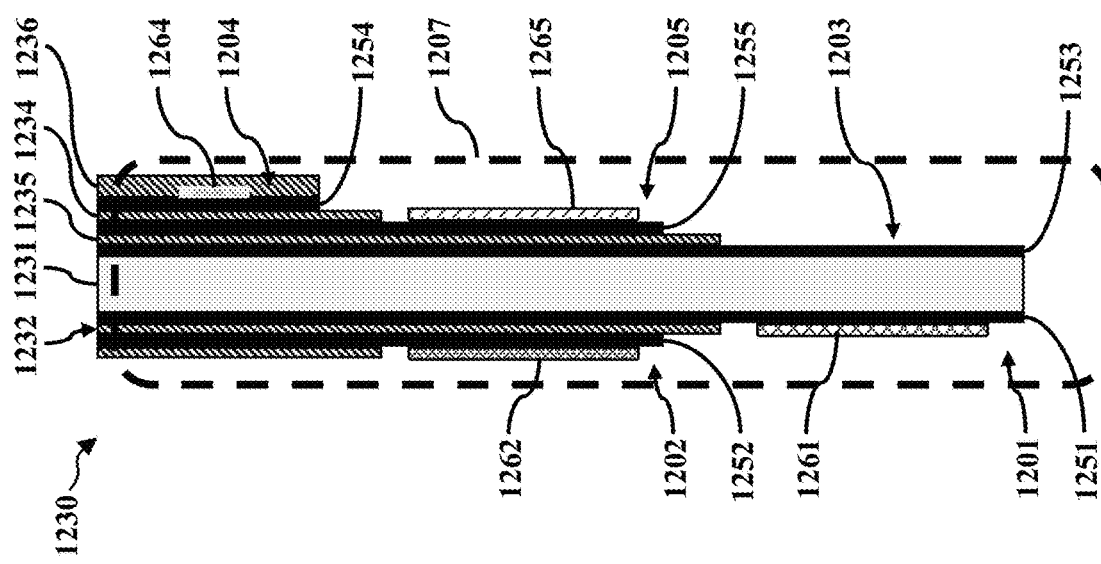
FIG. 13C shows a cross sectional view of a multi-channel analyte sensor according to one embodiment of the present disclosure.

FIG. 13C shows a cross sectional view of a multi-channel analyte sensor according to one embodiment of the present disclosure. The embodiment shown in FIG. 13C is substantially similar to the embodiment shown in FIG. 13B, and like numerals refer to like components, whose descriptions will not be repeated herein. The embodiment shown in FIG. 13C further includes a third working electrode 1205, which includes a fifth conducting layer 1255 and which may further include a third sensing layer 1265. A fifth insulation layer 1235 is disposed on the third conducting layer 1253, and the fifth conducting layer 1255 is disposed on the fifth insulation layer 1235. In the embodiment shown in FIG. 13C, the third insulation layer 1234, the fourth conducting layer 1254, the layer 1264, and the fourth insulation layer 1236 are stacked on the fifth conducting layer 1255. As discussed in more detail below, according to some embodiments of the present disclosure, the third working electrode 1205 may be used to measure an individual background signal or background current.

FIGS. 13B and 13C both depict a membrane 1207 surrounding the insertion tip 1230. According to some embodiments of the present disclosure, the membrane 1207 acts as a mass transport limiting layer, e.g., an analyte flux modulating layer, that may be included with the sensor to act as a diffusion-limiting barrier to reduce the rate of mass transport of the analyte, for example, glucose or lactate, into the region around the working electrodes (e.g., first working electrode 1201 and second working electrode 1202). The mass transport limiting layer is useful in limiting the flux of an analyte to a working electrode in an electrochemical sensor so that the sensor is linearly responsive over a large range of analyte concentrations and is easily calibrated. Mass transport limiting layers may include polymers and may be biocompatible. A mass transport limiting layer may serve multiple functions, e.g., functionalities of a biocompatible layer and/or interferent-eliminating layer may be provided by the mass transport limiting layer.

In certain embodiments, a mass transport limiting layer is a membrane composed of crosslinked polymers containing heterocyclic nitrogen groups, such as polymers of polyvinylpyridine and polyvinylimidazole. Electrochemical sensors equipped with such membranes have considerable sensitivity and stability, and a large signal-to-noise ratio, in a variety of conditions.

According to certain embodiments, a membrane is formed by crosslinking in situ a polymer, modified with a zwitterionic moiety, a non-pyridine copolymer component, and optionally another moiety that is either hydrophilic or hydrophobic, and/or has other desirable properties, in an alcohol-buffer solution. The modified polymer may be made from a precursor polymer containing heterocyclic nitrogen groups. Optionally, hydrophilic or hydrophobic modifiers may be used to "fine-tune" the permeability of the resulting membrane to an analyte of interest. Optional hydrophilic modifiers, such as poly(ethylene glycol), hydroxyl or polyhydroxyl modifiers, may be used to enhance the biocompatibility of the polymer or the resulting membrane.

While FIGS. 12, 13A, 13B, and 13C and the above discussion describe embodiments that include stacked, substantially planar layers, embodiments of the present disclosure are not limited thereto and may be implemented using other physical structures, such as a construction of substantially cylindrical layers arranged around an axis (e.g., constructed through dip-coating).

Figure 14:
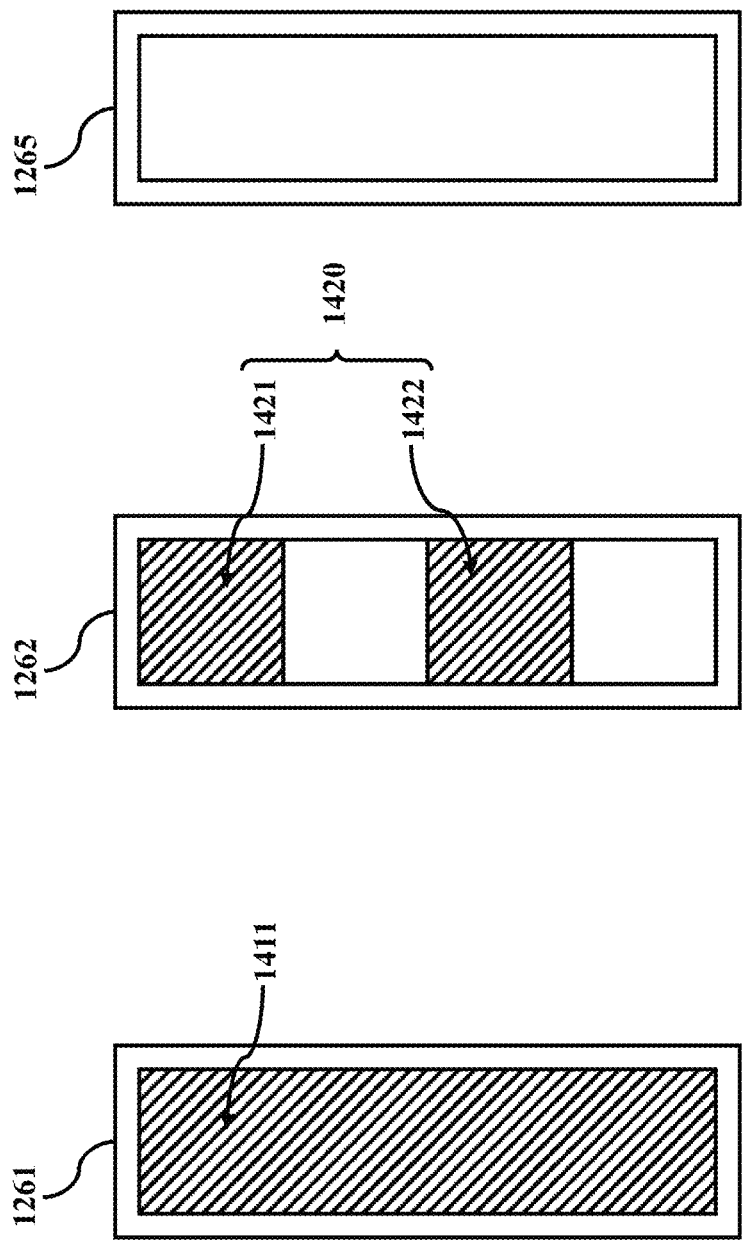
FIG. 14 is a schematic depiction of sensing layers of working electrodes according to one embodiment of the present disclosure.

FIG. 14 is a schematic depiction of sensing layers of working electrodes according to one embodiment of the present disclosure. In particular, FIG. 14 depicts a first sensing layer 1261 of a first working electrode 1201, a second sensing layer 1262 of a second working electrode 1202, and a third sensing layer 1265 of a third working electrode 1205 according to one embodiment of the present disclosure. Some of the sensing layers, such as the first sensing layer 1261 and the second sensing layer 1262, may include a catalyst which is capable of catalyzing a reaction of the analyte.

Some analytes, such as oxygen, can be directly electrooxidized or electroreduced on a sensor, and more specifically at least on a working electrode of a sensor. For other analytes, such as glucose and lactate, the presence of at least one electron transfer agent and/or at least one catalyst can facilitate the electrooxidation or electroreduction of the analyte. Catalysts may also be used for those analytes, such as oxygen, that can be directly electrooxidized or electroreduced on the working electrode. For these analytes, each working electrode includes a sensing layer (see for example sensing layer 1261 of FIG. 13B) formed proximate to or on a surface of a working electrode. In many embodiments, a sensing layer is formed near or on only a small portion of at least a working electrode.

A variety of different sensing layer configurations may be used. In certain embodiments, the sensing layer is deposited on the conductive material of a working electrode. The sensing layer may extend beyond the conductive material of the working electrode. In some cases, the sensing layer may also extend over other electrodes, e.g., over the counter electrode and/or reference electrode (or counter/reference is provided). The sensing layer may be integral with the material of an electrode.

A sensing layer that is in direct contact with the working electrode may contain an electron transfer agent to transfer electrons directly or indirectly between the analyte and the working electrode, and/or a catalyst to facilitate a reaction of the analyte.

A sensing layer that is not in direct contact with the working electrode may include a catalyst that facilitates a reaction of the analyte. However, such sensing layers may not include an electron transfer agent that transfers electrons directly from the working electrode to the analyte, as the sensing layer is spaced apart from the working electrode. One example of this type of sensor is a glucose or lactate sensor which includes an enzyme (e.g., glucose oxidase, glucose dehydrogenase, lactate oxidase, and the like) in the sensing layer. The glucose or lactate may react with a second compound in the presence of the enzyme. The second compound may then be electrooxidized or electroreduced at the electrode. Changes in the signal at the electrode indicate changes in the level of the second compound in the fluid and are proportional to changes in glucose or lactate level and, thus, correlate to the analyte level.

In certain embodiments which include more than one working electrode, one or more of the working electrodes do not have a corresponding sensing layer, or have a sensing layer which does not contain one or more components (e.g., an electron transfer agent and/or catalyst) needed to electrolyze the analyte. Thus, the signal at this working electrode corresponds to background signal which may be removed from the analyte signal obtained from one or more other working electrodes that are associated with fully-functional sensing layers by, for example, subtracting the signal.

In certain embodiments, the sensing layer includes one or more electron transfer agents. Electron transfer agents that may be employed are electroreducible and electrooxidizable ions or molecules having redox potentials that are a few hundred millivolts above or below the redox potential of the standard calomel electrode (SCE). The electron transfer agent may be organic, organometallic, or inorganic.

In certain embodiments, electron transfer agents have structures or charges which prevent or substantially reduce the diffusional loss of the electron transfer agent during the period of time that the sample is being analyzed. For example, electron transfer agents include but are not limited to a redox species, e.g., bound to a polymer which can in turn be disposed on or near the working electrode. The bond between the redox species and the polymer may be covalent, coordinative, or ionic. Although any organic or organometallic redox species may be bound to a polymer and used as an electron transfer agent, in certain embodiments the redox species is a transition metal compound or complex, e.g., osmium, ruthenium, iron, and cobalt compounds or complexes. It will be recognized that many redox species described for use with a polymeric component may also be used, without a polymeric component.

One type of polymeric electron transfer agent contains a redox species covalently bound in a polymeric composition. An example of this type of mediator is poly(vinylferrocene). Another type of electron transfer agent contains an ionically-bound redox species. This type of mediator may include a charged polymer coupled to an oppositely charged redox species. Examples of this type of mediator include a negatively charged polymer coupled to a positively charged redox species such as an osmium or ruthenium polypyridyl cation. Another example of an ionically-bound mediator is a positively charged polymer such as quaternized poly(4-vinyl pyridine) or poly(1-vinyl imidazole) coupled to a negatively charged redox species such as ferricyanide or ferrocyanide. In other embodiments, electron transfer agents include a redox species coordinatively bound to a polymer. For example, the mediator may be formed by coordination of an osmium or cobalt 2,2'-bipyridyl complex to poly(1-vinyl imidazole) or poly(4-vinyl pyridine).

Suitable electron transfer agents are osmium transition metal complexes with one or more ligands, each ligand having a nitrogen-containing heterocycle such as 2,2'-bipyridine, 1,10-phenanthroline, or derivatives thereof. The electron transfer agents may also have one or more ligands covalently bound in a polymer, each ligand having at least one nitrogen-containing heterocycle, such as pyridine, imidazole, or derivatives thereof. The present disclosure may employ electron transfer agents having a redox potential ranging from about −100 mV to about +150 mV versus the standard calomel electrode (SCE), e.g., ranges from about −100 mV to about +150 mV, e.g., ranges from about −50 mV to about +50 mV, e.g., electron transfer agents have osmium redox centers and a redox potential ranging from +50 mV to −150 mV versus SCE.

The sensing layer may also include a catalyst which is capable of catalyzing a reaction of the analyte. The catalyst may also, in some embodiments, act as an electron transfer agent. One example of a suitable catalyst is an enzyme which catalyzes a reaction of the analyte. For example, a catalyst, such as a glucose oxidase, glucose dehydrogenase (e.g., pyrroloquinoline quinone glucose dehydrogenase (PQQ)), or oligosaccharide dehydrogenase), may be used when the analyte of interest is glucose. A lactate oxidase or lactate dehydrogenase may be used when the analyte of interest is lactate. Laccase may be used when the analyte of interest is oxygen or when oxygen is generated or consumed in response to a reaction of the analyte.

In certain embodiments, a catalyst may be attached to a polymer, cross linking the catalyst with another electron transfer agent (which, as described above, may be polymeric). A second catalyst may also be used in certain embodiments. This second catalyst may be used to catalyze a reaction of a product compound resulting from the catalyzed reaction of the analyte. The second catalyst may operate with an electron transfer agent to electrolyze the product compound to generate a signal at the working electrode. Alternatively, a second catalyst may be provided in an interferent-eliminating layer to catalyze reactions that remove interferents.

Certain embodiments include a Wired Enzyme™ sensing layer that works at a gentle oxidizing potential, e.g., a potential of about −40 mV. This sensing layer uses an osmium (Os)-based mediator designed for low potential operation and is stably anchored in a polymeric layer. Accordingly, in certain embodiments the sensing element is a redox active component that includes (1) Osmium-based mediator molecules attached by stable (bidentate) ligands anchored to a polymeric backbone, and (2) glucose oxidase enzyme molecules. These two constituents are crosslinked together.

In the embodiment shown in FIG. 14, the first sensing layer 1261 has a first active region 1411 on which a catalyst (e.g., an enzyme) is deposited; the second sensing layer 1262 has a second active region 1420 on which the catalyst is deposited, where the second active region may have two subregions 1421 and 1422; and the third sensing layer 1265 may have no catalyst deposited thereon or, in other words, the catalyst is not deposited on the third sensing layer 1265. According to some embodiments of the present disclosure, the portions of the second sensing layer 1262 and the third sensing layer 1265 on which no catalyst for reacting with the analyte is deposited may instead include a dummy catalyst for providing redox sensitivity.

As shown in FIG. 14, according to some embodiments of the present disclosure, the surface area in which the catalyst is deposited on the different sensing layers—such as the first sensing layer 1261, the second sensing layer 1262, and the third sensing layer 1265—may differ between the sensing layers. For example, the first sensing layer 1261, the second sensing layer 1262, and the third sensing layer 1265 may have the same total surface area, but the surface areas of the active regions or regions that contain catalyst (or enzyme) may differ. In the specific example shown in FIG. 14, the first active region 1411 of the first sensing layer 1261 has twice the surface area as the second active region 1420 of the second sensing layer 1262 (equivalently, the second active region 1420 may be considered as having half the surface area as the first active region 1411). Accordingly, according to some embodiments of the present disclosure, the first sensing layer 1261 has a first active region 1411 that has a larger surface area than the second active region 1420 of the second sensing layer 1262. In some embodiments, the first active region 1411 of the first sensing layer 1261 has a larger quantity of catalyst than the second active region 1420 of the second sensing layer 1262.

As noted above, according to some embodiments of the present disclosure, the third sensing layer 1265 does not include an active region in which catalyst is disposed, although embodiments of the present disclosure are not limited thereto.

While FIG. 14 depicts the first active region 1411 as having a single contiguous region, embodiments of the present disclosure are not limited thereto and may have, for example, a plurality of non-contiguous subregions.

While FIG. 14 depicts the second active region 1420 as having two non-contiguous subregions 1421 and 1422, embodiments of the present disclosure are not limited thereto, and the second active region may include, for example, a single contiguous active region, or more than two non-contiguous subregions.

While FIG. 14 depicts the active regions in which enzyme or catalyst is deposited as having a substantially planar, rectangular shape, embodiments of the present disclosure are not limited thereto, and the enzyme or catalyst may be deposited in other shapes, such as substantially planar circles, or may have a three-dimensional shape such as a rectangular prism, a cylinder, a hemisphere, or the like.

While FIG. 14 depicts the second sensing layer 1262 as having a smaller area having catalyst deposited thereon than the first sensing layer 1261, embodiments of the present disclosure are not limited thereto. For example, in some embodiments of the present disclosure, the area of the second sensing layer 1262 on which catalyst is deposited is the same as that of the first sensing layer 1261 (in other words, the first sensing layer 1261 and the second sensing layer 1262 have the same amount or quantity of catalyst or enzyme deposited on them).

While FIGS. 13B and 13C depict the first sensing layer 1261 of the first working electrode 1201 and the second sensing layer 1262 of the second working electrode 1202 as being on the same side of the substrate 1231, embodiments of the present disclosure are not limited thereto. For example, the second sensing layer 1262 may be located on the opposite side of the substrate 1231 from the first sensing layer 1261 (e.g., on the same side of the substrate 1231 as the counter electrode 1203).

While FIG. 13C depicts an embodiment including three working electrodes, including the first working electrode, the second working electrode, and the third working electrode, embodiments of the present disclosure are not limited thereto. For example, in some embodiments of the present disclosure, the first working electrode 1201 configured to detect analyte and the third working electrode 1205 configured to detect an individual background offset may be used together without including a second working electrode 1202 on the insertion tip 1230. Equivalently or similarly, the second sensing layer 1262 of the second working electrode 1202 may be substantially similar to the third sensing layer 1265 depicted in FIG. 14 in that it may be free of the catalyst that interacts with the target analyte.

Detecting Background Current Using Multi-Channel Analyte Sensors

Some aspects of embodiments of the present disclosure relate to using multiple sensors to detect a background current in real time from an individual. According to some embodiments of the present disclosure, the detected background current or detected background signal can then be used to correct an analyte signal output from an analyte sensor by reducing or removing the background noise.

As discussed above, some aspects of the present disclosure relate to subtracting or reducing a background current in a signal by adjusting a detected analyte signal based on a global background offset (time-varying or time-invariant).

According to some embodiments of the present disclosure, a multi-channel analyte sensor, such as an analyte sensor as described above with respect to FIGS. 12, 13A, 13B, 13C, and 14, is used to concurrently detect both an analyte signal and an individual background signal from a patient.

According to some embodiments of the present disclosure, signals measured by the first working electrode 1201 and the second working electrode 1202 are used to perform a removal of a background current.

As discussed above, the analyte sensors may be configured to output a signal in accordance with the relationship $i = m*C + b$, where i is the measured current of the analyte sensor, m is the sensitivity of the analyte sensor, C is the concentration of the analyte, and b is an offset corresponding to the background signal.

According to some embodiments, the first sensing layer 1261 of the first working electrode 1201 and the second sensing layer 1262 of the second working electrode 1202 have different sensitivities m due to different surface areas (or sizes) of their respective active regions. In the above example, the second sensing layer 1262 includes half as much catalyst as the first sensing layer 1261, and therefore the sensitivity $m_2$ of the second sensing layer 1262 may be approximately half of the sensitivity $m_1$ of the first sensing layer 1261 ($m_2 \approx 0.5*m_1$). More generally, a ratio k may represent the amount (or surface area) of catalyst deposited on the second sensing layer 1262 divided by the amount of catalyst deposited on the first sensing layer 1261, such that $m_2 \approx k*m_1$.

Figure 15A:
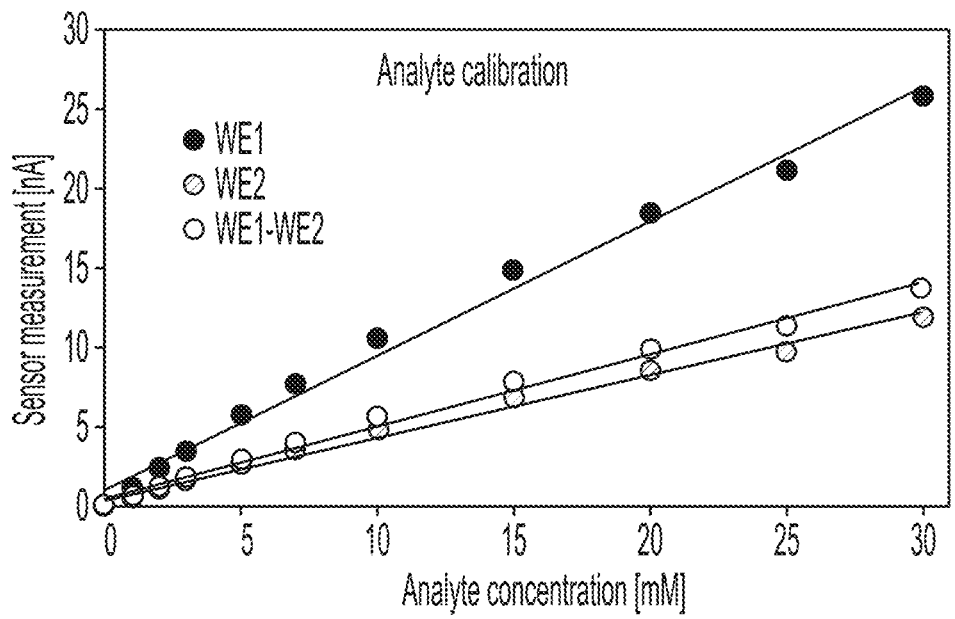
FIGS. 15A and 15B are graphs depicting in vitro calibration data for dual glucose sensors having different sensitivities as calibrated using an analyte and an interferent, respectively.
Figure 15B:
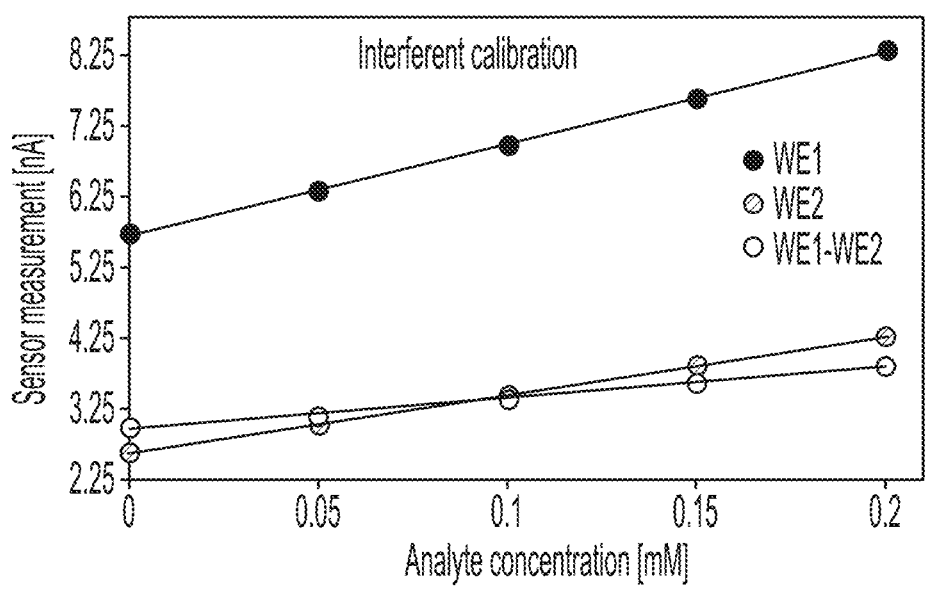

FIGS. 15A and 15B are graphs depicting in vitro calibration data for dual glucose sensors having different sensitivities as calibrated using an analyte and an interferent, respectively. Ascorbic acid is one example of a known interferent that reacts with a working electrode in a manner similar to glucose that can therefore cause a false positive reading when glucose is the target analyte or analyte of interest.

Each of FIGS. 15A and 15B includes a measured current with respect to concentration of glucose or ascorbic acid, respectively, for a first current WE1 measured from a first working electrode (e.g., first working electrode 1201) and a second current WE2 measured from a second working electrode (e.g., second working electrode 1202), where the first working electrode 1201 has about twice as much glucose sensing area as the second working electrode 1202 (e.g., consistent with FIG. 14, the active area of the first working electrode is about twice as large as the active area of the second working electrode). Each graph also plots a difference WE1-WE2 between the two measured currents. Each trace is the average (mean) of six sensors.

Table 1 provides a summary of the in vitro calibration data shown in FIGS. 15A and 15B.

| Sensor | Channel | Glucose Sensitivity (nA/mM) | Ascorbic Acid Sensitivity (nA/mM) | Glucose/ Ascorbic Acid Sensitivity |
|---|---|---|---|---|
| 1 | WE1 | 0.92 | 14.3 | 0.064 |
|   | WE2 | 0.37 | 9.4 | 0.039 |
|   | Δ(WE1 − WE2) | 0.55 | 4.9 | 0.113 |
| 2 | WE1 | 0.83 | 14.1 | 0.059 |
|   | WE2 | 0.46 | 9.1 | 0.050 |
|   | Δ(WE1 − WE2) | 0.37 | 4.9 | 0.076 |
| 3 | WE1 | 0.86 | 11.7 | 0.074 |
|   | WE2 | 0.38 | 7.6 | 0.050 |
|   | Δ(WE1 − WE2) | 0.48 | 4.1 | 0.119 |
| 4 | WE1 | 0.80 | 11.9 | 0.068 |
|   | WE2 | 0.38 | 7.3 | 0.052 |
|   | Δ(WE1 − WE2) | 0.42 | 4.5 | 0.093 |
| 5 | WE1 | 0.81 | 11.7 | 0.069 |
|   | WE2 | 0.40 | 7.7 | 0.053 |
|   | Δ(WE1 − WE2) | 0.40 | 4.1 | 0.100 |
| 6 | WE1 | 0.82 | 11.8 | 0.070 |
|   | WE2 | 0.35 | 7.9 | 0.044 |
|   | Δ(WE1 − WE2) | 0.47 | 3.8 | 0.123 |
| Mean | WE1 | 0.84 | 12.6 | 0.067 |
|   | WE2 | 0.39 | 8.2 | 0.048 |
|   | Δ(WE1 − WE2) | 0.45 | 4.4 | 0.103 |

For each of the six sensors tested, the glucose sensitivity, ascorbic acid sensitivity, and ratio between these two values is listed for the signal obtained from WE1 and WE2 as well as the differential signal obtained by subtracting the response of WE2 from WE1 (Δ(WE1−WE2)). The mean average of these values for the six sensors tested is also listed. Note that in each of the six sensors tested, the ratio between the glucose sensitivity and ascorbic acid sensitivity is highest when the differential signal obtained by subtracting the response of WE2 from WE1 is used as the measurement.

In the embodiments shown above, the first working electrode 1201 (WE1) and the second working electrode 1202 (WE2) have similar total areas. Accordingly, both working electrodes are expected to detect approximately the same background current. On the other hand, because they have different amounts of catalyst deposited on their respective sensing layers, their sensitivities differ by a ratio k, as discussed above.

The first current $i_1$ or WE1 measured by the first working electrode 1201 may be interpreted as the sum of a signal $m_1 \ast C$ corresponding to the concentration of the analyte and a background offset b:

$$WE1 = m_1 \ast C + b$$

Likewise, second current $i_2$ or WE2 measured by the second working electrode 1202 may be interpreted as the sum of a signal $m_2 \ast C$ corresponding to the concentration of the analyte and a background offset b:

$$WE2 = m_2 \ast C + b$$

Because it is assumed that $m_2 \approx k \ast m_1$, the second current WE2 or $i_2$ can be expressed as:

$$WE2 = k \ast m_1 \ast C + b$$

In addition, assuming that the background offset b measured by the first and second working electrodes is substantially the same, WE1−WE2 can be expressed as:

$$WE1 - WE2 = (m_1 \ast C + b) - (k \ast m_1 \ast C + b)$$
$$= (m_1 \ast C + b) - k \ast m_1 \ast C + b$$
$$= m_1 \ast C - k \ast m_1 \ast C + b - b$$
$$= (1 - k) \ast m_1 \ast C$$

Accordingly, the computed difference WE1−WE2 corresponds to a scaled version of the concentration of the analyte with substantially no individual background signal b. A reasonable estimate of the values $m_1$ and k, or equivalently $m_1$ and $m_2$, are known ahead of time by the design of the sensor, possibly coupled with information from the production lot sample.

Likewise, the background signal b can be computed by scaling the above value of WE1−WE2 and subtracting the scaled value from the original measured currents WE1 or WE2. For example, given that:

$$WE1 - WE2 = (1 - k) \ast m_1 \ast C$$

then $$\frac{WE1 - WE2}{1 - k} = m_1 \ast C$$

Accordingly, starting with measured current WE1 through the first working electrode 1201:

$$WE1 = m_1 \ast C + b$$
$$WE1 = \frac{WE1 - WE2}{1 - k} + b$$
$$WE1 - \frac{WE1 - WE2}{1 - k} = b$$

Alternatively, in some embodiments, a similar calculation may be performed based on WE2, such as:

$$WE2 = k \ast m_1 \ast C + b$$
$$WE2 = k \ast \frac{WE1 - WE2}{1 - k} + b$$
$$WE2 - k \ast \frac{WE1 - WE2}{1 - k} = b$$

Figure 16:
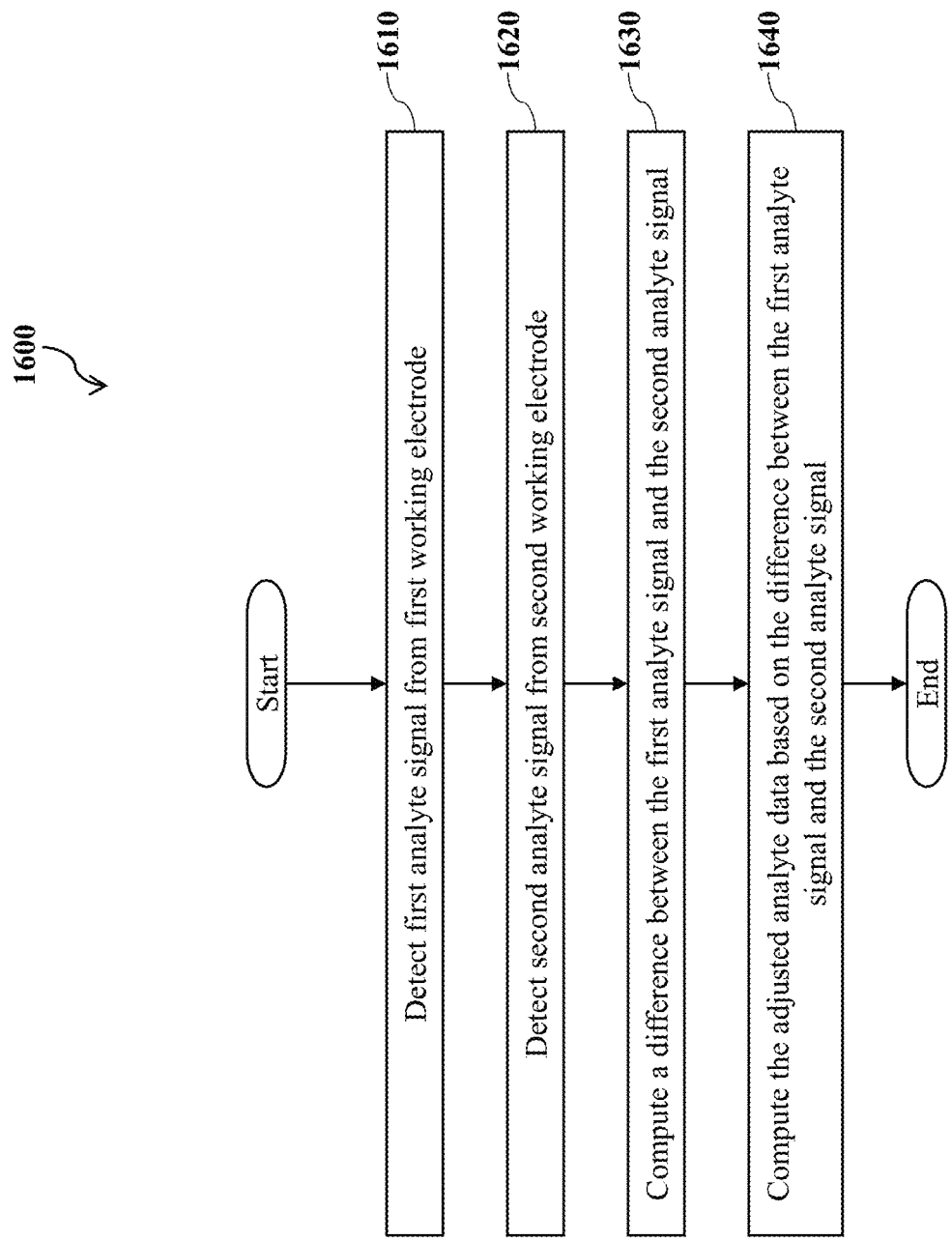
FIG. 16 is a flowchart of a method for computing and/or removing an individual background offset according to one embodiment of the present disclosure.

FIG. 16 is a flowchart of a method 1600 for computing and/or removing an individual background offset according to one embodiment of the present disclosure. In the embodiment shown in FIG. 16, in operation 1610, the analyte monitoring system 100 detects an analyte signal (or first analyte signal) from the first working electrode (e.g., first working electrode 1201) of the analyte sensor, and in operation 1620, the analyte monitoring system 100 detects a second analyte signal from the second working electrode (e.g., second working electrode 1202) of the analyte sensor. In some embodiments of the present disclosure, the first analyte signal and the second analyte signal are detected concurrently and/or substantially simultaneously.

In operation 1630, the analyte monitoring system 100 computes a difference between the first analyte signal and the second analyte signal. For example, the first analyte signal may correspond to the current WE1 measured from the first working electrode, as discussed above, and the second analyte signal may correspond to the current WE2 measured from the second working electrode, as discussed above, such that the difference between the first analyte signal and the second analyte signal may correspond to the difference WE1−WE2.

Accordingly, in operation 1640, the analyte monitoring system 100 computes adjusted analyte data based on the difference between the (first) analyte signal and the second analyte signal (WE1−WE2).

For example, in some embodiments, the difference WE1−WE2 is output as the adjusted analyte data (in some embodiments, with some amount of scaling to account for, for example, the 1−k factor of the sensitivity of the adjusted analyte data).

In some embodiments, the analyte monitoring system 100 computes an individual offset, as discussed above. The calculated individual offset may then be further processed to compute an offset, as discussed in more detail below.

In some embodiments of the present disclosure, the insertion tip 1230 includes a working electrode that does not include an additional catalyst or enzyme. In the particular examples discussed above with respect to FIGS. 13C and 14, the third working electrode 1205 includes a third sensing layer 1265 that is free of (or substantially free of) catalyst (e.g., the catalyst deposited on the active region 1411 of the first sensing layer 1261 to react with the target analyte). Accordingly, the signal or current measured through the third working electrode 1205 may be assumed to be a measurement of a background signal or background current, because the third sensing layer 1265 of such a third working electrode 1205 is substantially nonreactive to the target analyte. As such, embodiments of the present disclosure that include a working electrode that is substantially free of catalyst or that does not include catalyst for reacting with the target analyte can be used to measure a background signal or background current directly from the interstitial fluid of a patient.

Accordingly, aspects of embodiments of the present disclosure relate to systems and methods for removing or detecting an individual background signal of a patient.

In another scenario, the amount of offset may not be the same. After identifying the common offset as previously described, in some aspects of embodiments of the present disclosure, a relative offset can be identified to further improve the accuracy of the system. Using the known $m_1$ and $m_2$ values and an estimate of the offset b as described above, adjusted quantities y1 and y2 can be calculated at any time t, (as shown, for example, in the top subplot in FIG. 17).

$$y1=[WE1-b]/m_1$$

$$y2=[WE2-b]/m_2$$

Let TW be a time window (for example, TW may be 4 hours, or 12 hours, or 24 hours) wherein the magnitude of the relative offset is assumed to be sufficiently constant. At any given time instant t, assume there are Nw adjusted quantities y1 and y2 from the two electrodes at time instances between t and t−TW. Collect these Nw adjusted quantities into time-paired sets (y1(1), y2(1)), (y1(2), y2(2)), (y1(3), y2(3)), . . . , (y1(Nw), y2(Nw)).

In one embodiment, the offset of y1 relative to y2 is estimated by finding the parameters associated with the following relationship based on the Nw pairs of adjusted quantities:

$$y1=K_1*y2+\delta$$

The determination of $K_1$ and $\delta$ can be done by a variety of methods such as linear regression, orthogonal regression, or Deming regression. An illustration of the determination of $\delta$ using TW equal to 96 hours is shown in the bottom subplot of FIG. 17. Then, in addition to the common offset, the relative offset can be removed from y1 if it is determined that y2 is more reliable than y1 in a recent time window TR, where TR may be the same time window as TW or a time window different from TW. For example, TR can be 2 hours, or 6 hours, or 24 hours. Criteria to determine which of the two adjusted quantities (y1 versus y2) is more reliable can be based on statistical properties of each channel (for example variance, standard deviation, power spectral density, etc.) or relative statistical properties of both channels (for example which one has larger standard deviation).

For example, if y2 is currently determined to be more reliable than y1, then the presented analyte value yv based on y1 is adjusted by the latest $\delta$ estimate:

$$yv=y1-\delta$$

Figure 17:
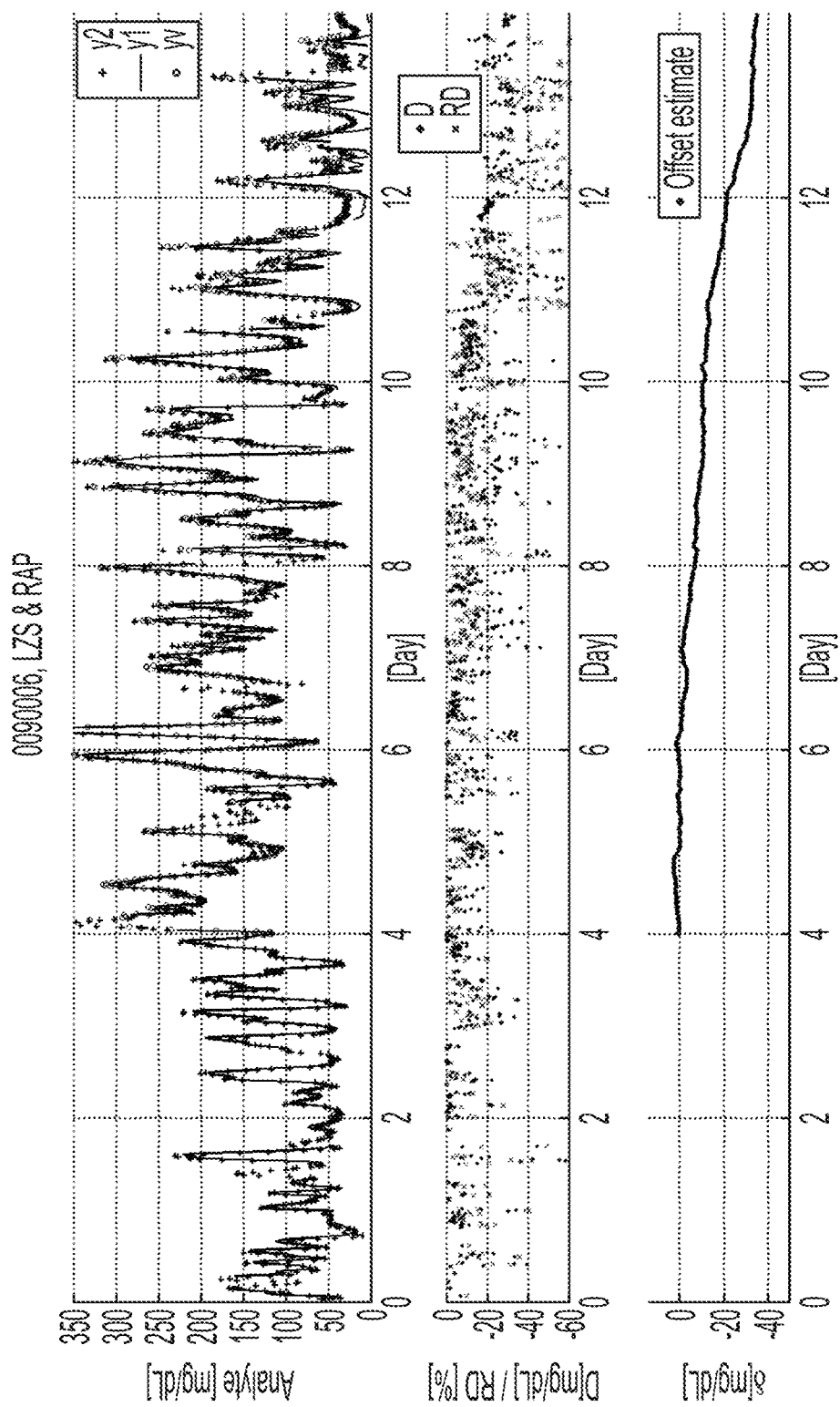
FIG. 17 depicts measurements from two channels of sensor data over a 14-day wear period and differences between the measurements of the two sensors.

An illustration of this adjusted value is shown in the top subplot of FIG. 17.

In the case when y2 is currently determined to be more reliable than y1, and the latest $\delta$ estimate is less than a first negative threshold Knegative1, then a determination can be made that y1 is experiencing a system fault (such as LSA). In one embodiment, this triggers the end of sensor life. In another embodiment, the presented analyte value yv based on the adjustment $yv=y1-\delta$, is still used provided that the latest $\delta$ estimate is less than a second negative threshold Knegative2, but larger than a more negative threshold Knegative3, and the end of sensor life is triggered when $\delta$ estimate is less than the third negative threshold Knegative3.

If y1 is currently determined to be more reliable than y2, then the presented analyte value yv based on y1 do not need to be adjusted by the latest $\delta$ estimate (e.g., $\delta=0$):

$$yv=y1=0$$

An estimate the offset of y2 relative to y1 can be computed by following the same procedure described, by switching the roles of y1 and y2.

In another embodiment, the common offset b may be zero, and only the relative offset $\delta$ is determined. The procedure described can be completed by setting b to zero.

Computing an Offset from One or More Individual and Global Offsets

As discussed above with respect to FIG. 11, in various embodiments of the present disclosure, an offset may be computed based on fixed and/or time-varying offsets, where the offsets may be global or individual.

According to some embodiments of the present disclosure, a global background offset is calculated based on data from several different sensor wears across several different patients, as discussed above with respect to FIG. 8. The global background offset may include a time-varying global background offset, based on a time elapsed since the beginning of the wear, and a time-invariant global background offset, which is a fixed or constant value over time.

According to some embodiments of the present disclosure, an individual background offset may be calculated based on measurements from a particular patient. For example, a background signal or background current can be measured for a particular patient as described above using a multi-channel analyte sensor (see, e.g., the description of FIG. 16) and/or through the use of a dedicated working electrode for measuring a background signal. The individual background signal or individual background current measured during a particular wear may be used in "real time" for calculating the offset. In addition, in some embodiments of the present disclosure, the analyte monitoring system 100 stores the individual background offsets measured during the various wears as historical individual background offsets and computes an individual background model (or statistical model) based on the historical individual background offsets, such as by computing an average of the historical individual background offsets (in some embodiments, outlier historical individual background offsets are removed prior to computing the model).

Referring back to FIG. 11, in some embodiments of the present disclosure, the analyte monitoring system 100 subtracts an offset from the analyte signal in operation 1110. In various embodiments of the present disclosure, the analyte monitoring system 100 obtains the offset based on one or more of time-varying or time-invariant (or fixed) global and individual offsets such as those described above.

In some embodiments of the present disclosure, the analyte monitoring system 100 applies an offset that is based on a global background offset alone. The global background offset may be time-varying or time-invariant.

In some embodiments of the present disclosure, the analyte monitoring system 100 applies an individual background offset alone. The individual background offset may be time-varying or time-invariant. The time-varying or time-invariant individual offset may be computed in real-time based on measurements taken from a working electrode of the analyte sensor, as discussed above, without considering individual or global historical measurements. The time-varying or time-invariant individual offset may be computed for a particular patient based on the patient's historical data to generate an individual historical background offset model (time-varying or time-invariant) that is applied throughout the wear. In some embodiments of the present disclosure, an individual background offset is computed based on a combination of the real-time individual background offset and the individual historical background offset model, such as through a linear combination (e.g., weighting the real-time individual background offset and the individual historical background offset model).

In some embodiments of the present disclosure, any of the global background offsets described above is combined with any of the individual background offset models described above, through, for example, a linear combination. For example, the global background offset and/or the individual background offsets may be time-varying or time-invariant, and the individual background offset may be real-time, historical, or a combination thereof.

Accordingly, aspects of embodiments of the present disclosure relate to systems and methods for reducing or removing a background signal from an analyte signal.

Detecting Late Sensor Attenuation (LSA) Using Multi-Channel Sensors

Some aspects of embodiments of the present disclosure relate to systems and methods for detecting late sensor attenuation (LSA) using multi-channel sensors. Experimental results have shown that, when using multi-channel sensors having sensing layers at staggered (or different) depths, such as the multi-channel sensors shown in FIGS. 13A, 13B, and 13C, the LSA effect appears in the shallower channel sooner than in the deeper channel.

FIG. 17 depicts measurements from two channels of sensor data over a 14-day wear period and differences between the measurements of the two sensors located at different depths. In the embodiment shown in FIG. 17, the two channels of sensor data correspond to two different sensors that are inserted into the same individual at the same time. The concepts described using this illustration may apply to sensors designed with dual channels in a single filament (or sensor tail), as shown, for example, in FIGS. 13A, 13B, and 13C above, or two sensors on different filaments (or two different sensor tails). In the example shown in FIG. 17, channel 2 begins experiencing late sensor attenuation (LSA) after around 11 days. The middle subplot of FIG. 17 shows the difference (D) and the relative difference (RD) between the two sensors, and that the difference and relative difference begin to become more negative after around 11 days into the wear period. The bottom subplot shows the offset obtained from calculating an orthogonal fit between the two channels, with a moving time window to determine which time pairs to use, and a set number of days (4 days in this example) to calculate a fixed gain for the orthogonal fit. As in the D and RD plots, the offset (in the bottom subplot) from this orthogonal fit suggests a detectable change after about 10 days for this example. The top plot also shows an adjusted version of the data read from channel 2 based on the calculated fixed gain.

In the embodiments shown in FIGS. 13A, 13B, and 13C, the first sensing layer 1261 of the first working electrode 1201 and the second sensing layer 1262 of the second working electrode 1202 are located at different positions along the length of the insertion tip 1230. More specifically, the first sensing layer 1261 is depicted as being distal to the second sensing layer 1262 relative to the point at which the insertion tip 1230 connects to the base 1208 of the electrochemical analyte sensor 1200 (equivalently, the second sensing layer 1262 is proximal to the first sensing layer 1261). As such, when the insertion tip 1230 is properly inserted into a patient, the first sensing layer 1261 is deeper (under the surface of the skin 1210) than the second sensing layer 1262.

Accordingly, some aspects of embodiments of the present disclosure relate to detecting the onset of late sensor attenuation (LSA) through the analysis of the outputs of two channels of a multi-channel analyte sensor, where the two channels correspond to measurements from two analyte sensing layers located at different depths under the skin surface of a patient. Generally, embodiments of the present disclosure relate to detecting the onset of LSA based on detecting a level of disagreement between the outputs of the two channels.

In a system embodiment where more than one glucose sensing channel is placed in a single filament, where the primary channel and secondary channel are placed at different depths relative to the insertion site, the analyte monitoring system 100 assumes that the probability of the onset of faults (such as LSA) is different between the two (or more) channels and is a function of the position (or depth) of the corresponding sensing layer. In addition, the system may allow the different channels to have different sensitivities to analyte (e.g., glucose) concentration (see, for example, the discussion associated with FIG. 14, above).

Figure 18:
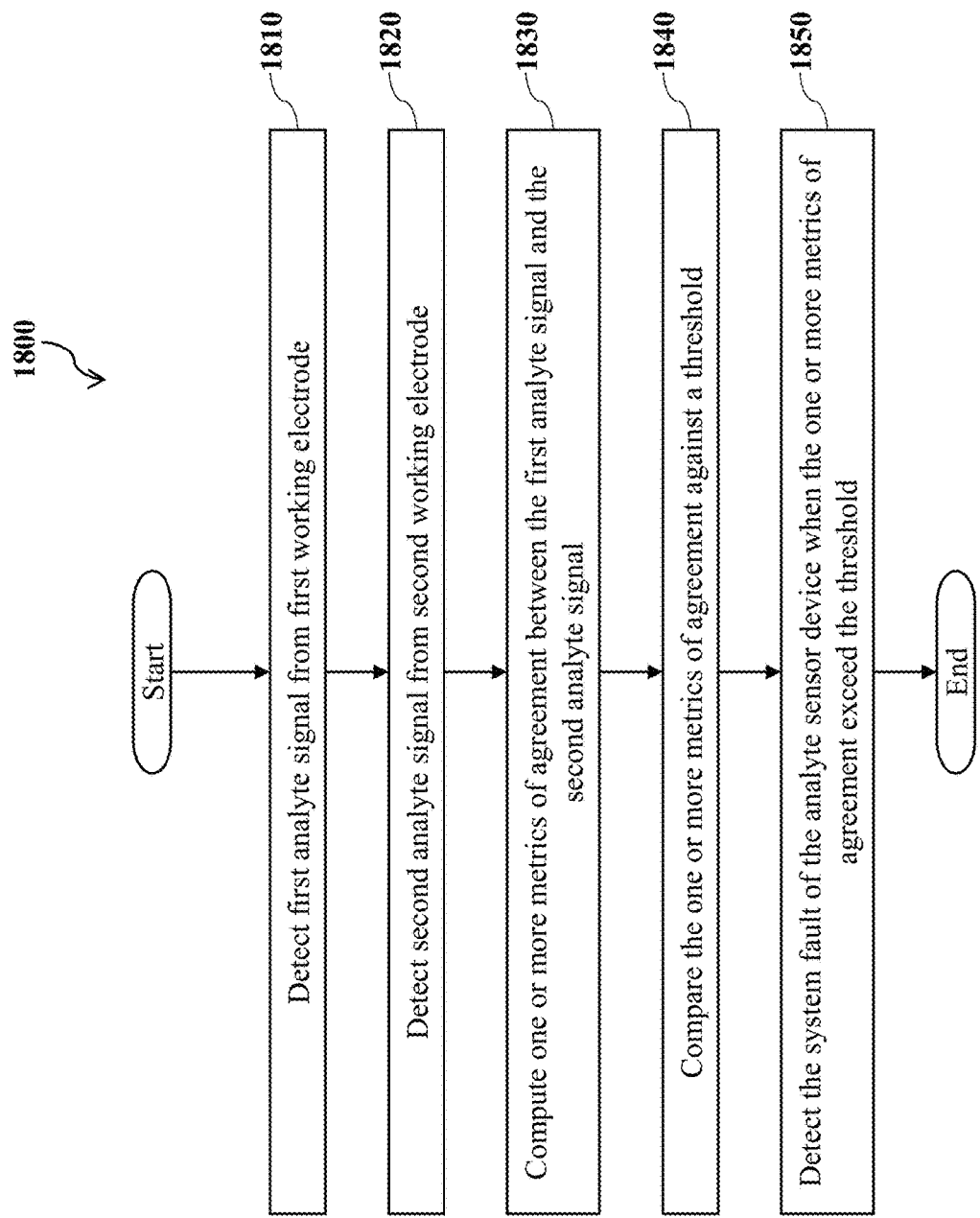
FIG. 18 is a flowchart of a method for detecting late sensor attenuation (LSA) according to one embodiment of the present disclosure.

FIG. 18 is a flowchart of a method 1800 for detecting late sensor attenuation (LSA) according to one embodiment of the present disclosure. In the embodiment shown in FIG. 18, in operation 1810, the analyte monitoring system 100 detects an analyte signal (or first analyte signal) from the first working electrode (e.g., first working electrode 1201) of the analyte sensor, and in operation 1820, the analyte monitoring system 100 detects a second analyte signal from the second working electrode (e.g., second working electrode 1202) of the analyte sensor. In some embodiments of the present disclosure, the first analyte signal and the second analyte signal are detected concurrently and/or substantially simultaneously.

According to one embodiment of the present disclosure, the onset of LSA is detected by fitting the signals from the two or more channels (e.g., the first analyte signal and the second analyte signal) against each other. This fit results in one or more parameters (such as slope and intercept), where one or more of the parameters may be fixed based on a predetermined time window relative to the start of the sensor, and one or more parameters may be allowed to change over the wear duration based on a moving time window with a predetermined width. The parameters can then be compared against one another to calculate, in operation 1830, one or more metrics of agreement such as difference (D), relative difference (RD), and/or orthogonal fit based on past data (e.g., based on a cumulative window from the start of the wear or a moving or sliding window over a particular time period), and then the one or more metrics of agreement can be compared against one or more threshold levels in operation 1840. When one or more of the metrics of agreement indicate that the measurements differ by more than the threshold level (or satisfies a threshold condition) or that the parameters are outside a particular range of acceptable values, then the analyte monitoring system determines, in operation 1850, that a system fault, such as LSA, has occurred.

In some embodiments of the present disclosure, the length of the moving time window may be adjusted according to factors specific to the sensor wear. For example, sensor wear with a higher between-day glucose variability may use a longer time window compared to a sensor wear with a lower between-day glucose variability. In another example, sensor wear with frequent instances of fast glucose rates of change may require a longer time window compared to a sensor with fewer instances of fast glucose rates of change.

In some embodiments of the present disclosure, in response to detecting that LSA has occurred, the analyte monitoring system 100 may perform one or more further actions. In some embodiments, the analyte monitoring system 100 generates an alert to inform the patient or user that the analyte sensor 102 has undergone a system fault. In some embodiments of the present disclosure, detecting the LSA shows that the data from the shallower channel (e.g., the second working electrode 1202) is faulty, but that the data from the deeper channel (e.g., the first working electrode 1201) may currently still be within a normal operating accuracy range. In some cases, the detection of the fault may require the early termination and replacement of the analyte sensor device 102, and the analyte monitoring system 100 generates a corresponding alert, which may be displayed on the analyte reader device 110/120.

In some embodiments of the present disclosure, the one or more parameters are used to reconstruct a system-fault-free signal by compensating for the fitted parameters on the channel experiencing the system fault. According to some embodiments of the present disclosure, the level of disagreement reflected by one or more metrics, such as the offset from the orthogonal fit, is used to construct a compensated signal on the channel that is experiencing a system fault such as LSA. Referring to FIG. 17, as discussed above, the orthogonal fit may be used to compute a fixed gain for the orthogonal fit. Along with the fixed gain from the orthogonal fit, a time-varying offset can be used to adjust channel 2 of the example shown in FIG. 17 to generate an adjusted or corrected time trace (labeled as "yv") which generally agrees with channel 1.

As such, in some embodiments of the present disclosure, after detecting a temporary system fault, the analyte monitoring system 100 further applies a correction of a signal (e.g., the second analyte signal or the first analyte signal) to compensate for the temporary sensor fault or temporary sensor noise.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method of operating an analyte sensor device in a manner so as to attempt to reduce a background signal in an analyte reading of the analyte sensor device, resulting in mitigation of an erroneous detection of the analyte reading and further resulting in improved control of a drug delivery pump, said method comprising:
   determine a drug dosage that is delivered to a user of the analyte sensor device via the drug delivery pump;
   deliver the drug dosage to the user via the drug delivery pump;
   receiving a first analyte signal and a second analyte signal measured by the analyte sensor device, which includes an analyte sensor, wherein the analyte sensor includes an in vivo portion;
   computing one or more metrics of agreement between the first analyte signal and the second analyte signal;
   comparing the one or more metrics of agreement against a threshold;
   in response to a determination that the one or more metrics of agreement exceed the threshold:
      computing an orthogonal fit between the first analyte signal and the second analyte signal;
      computing an offset based on the orthogonal fit;
      correcting at least one of the first analyte signal and the second analyte signal based on the offset in real-time;
      generating adjusted analyte data based on the corrected analyte signal in real-time, wherein generating the adjusted analyte data includes reducing the background signal in the corrected analyte signal;
      computing an analyte value based on the adjusted analyte data; and
      displaying the analyte value on a display device; and
   in response to computing the analyte value, which is based on the adjusted analyte data in which the background signal is reduced, modifying the drug dosage that is delivered to the user via the drug delivery pump and subsequently delivering the modified drug dosage to the user via the drug delivery pump, such that reduction of the background signal facilitates an improved accuracy of the analyte value, which is used to control the drug delivery pump.

2. The method of claim 1, further comprising:
   displaying a trend indicator;
   displaying an analyte level; or
   generating an alert.

3. The method of claim 1, wherein generating the adjusted analyte data further includes:
   subtracting an offset signal from the corrected analyte signal to generate an offset corrected signal;

calculating a plurality of sensitivities from the offset corrected signal, each sensitivity corresponding to a reference point of a plurality of analyte reference points;

computing a median of the sensitivities over a time window;

calculating the adjusted analyte data based on the offset corrected signal and the median of the sensitivities; and pairing the adjusted analyte data with the reference points.

4. The method of claim 3, wherein the offset signal is computed from a global time-varying background offset based on an elapsed time since activation of the analyte sensor device to compute the offset corrected signal.

5. The method of claim 3, wherein the offset signal is a time-invariant offset.

6. The method of claim 3, wherein the analyte sensor device comprises:
a first working electrode on the in vivo portion of the analyte sensor, the first working electrode having a first sensitivity; and
a second working electrode on the in vivo portion of the analyte sensors, the second working electrode having a second sensitivity lower than the first sensitivity.

7. The method of claim 6, wherein the first working electrode has a first active region having a first quantity of a catalyst disposed thereon, and wherein the second working electrode has a second active region having a second quantity of the catalyst disposed thereon, the second active region having a surface area smaller than that of the first active region.

8. The method of claim 7, wherein generating the adjusted analyte data further includes:
detecting the first analyte signal from the first working electrode;
detecting the second analyte signal from the second working electrode;
computing a difference between the first analyte signal and the second analyte signal; and
computing the adjusted analyte data based on the difference between the first analyte signal and the second analyte signal.

9. The method of claim 8, further comprising computing an individual background offset based on the first analyte signal, the second analyte signal, and the difference between the first analyte signal and the second analyte signal, wherein the offset signal is calculated based on the individual background offset.

10. The method of claim 6, wherein the second working electrode is configured to measure an individual background current, and wherein the offset signal is calculated based on the individual background current.

11. The method of claim 1, further comprising:
applying a temperature correction on the first analyte signal or the second analyte signal based on a temperature from a temperature sensor of the analyte sensor device.

12. The method of claim 1, wherein the in vivo portion of the analyte sensor extends from a body of the analyte sensor device and comprises:
a first working electrode, the first working electrode having a first sensing layer at a first position along a length of the in vivo portion; and
a second working electrode, the second working electrode having a second sensing layer at a second position along the length of the in vivo portion, the second position being proximal to the first position.

13. The method of claim 12, further comprising:
detecting the first analyte signal from the first working electrode; and
detecting the second analyte signal from the second working electrode.

14. The method of claim 13, wherein the offset is a fixed offset based on the orthogonal fit.

15. The method of claim 13, wherein the offset is a time-varying offset based on the orthogonal fit.

16. The method of claim 1, further comprising detecting a system fault of the analyte sensor device when the one or more metrics of agreement exceed the threshold, wherein the system fault is late sensor attenuation (LSA).

17. An analyte sensor device that is configured to operate in a manner so as to attempt to reduce a background signal in an analyte reading of the analyte sensor device, resulting in mitigation of an erroneous detection of the analyte reading and further resulting in improved control of a drug delivery pump, said analyte sensor device comprising:
a plurality of communication circuitry; and
a plurality of processing circuitry having memory storing instructions that, when executed by the processing circuitry, cause the processing circuitry to:
determine a drug dosage that is delivered to a user of the analyte sensor device via the drug delivery pump;
deliver the drug dosage to the user via the drug delivery pump;
receive a first analyte signal and a second analyte signal measured from the analyte sensor device, which includes an in vivo portion, the first analyte signal and the second analyte signal being received via the communication circuitry;
compute one or more metrics of agreement between the first analyte signal and the second analyte signal;
compare the one or more metrics of agreement against a threshold;
in response to a determination that the one or more metrics of agreement exceed the threshold:
compute an orthogonal fit between the first analyte signal and the second analyte signal;
compute an offset based on the orthogonal fit;
correct at least one of the first analyte signal and the second analyte signal based on the offset in real-time;
generate adjusted analyte data based on the corrected analyte signal by reducing the background signal in the corrected analyte signal in real-time;
compute an analyte value based on the adjusted analyte data; and
display the analyte value on a display device; and
in response to computing the analyte value, which is based on the adjusted analyte data in which the background signal is reduced, modify the drug dosage that is delivered to the user via the drug delivery pump and subsequently deliver the modified drug dosage to the user via the drug delivery pump, such that reduction of the background signal facilitates an improved accuracy of the analyte value, which is used to control the drug delivery pump.

18. The analyte device of claim 17, wherein the memory further stores instructions that, when executed by the processing circuitry, cause the processing circuitry to:
display a trend indicator;
display an analyte level; or
generate an alert.

19. The analyte device of claim 17, wherein the instructions to generate adjusted analyte data include instructions that, when executed by the processing circuitry, cause the processing circuitry to:
  subtract an offset signal from the corrected analyte signal to generate an offset corrected signal;
  calculate a plurality of sensitivities from the offset corrected signal, each sensitivity corresponding to a reference point of a plurality of analyte reference points;
  compute a median of the sensitivities over a time window;
  calculate the adjusted analyte data based on the offset corrected signal and the median of the sensitivities; and
  pair the adjusted analyte data with the reference points.

20. The analyte device of claim 19, wherein the offset signal is computed from a global time-varying background offset based on an elapsed time since activation of the analyte sensor device to compute the offset corrected signal.

21. The analyte device of claim 19, wherein the offset signal is a time-invariant off set.

22. The analyte device of claim 19, wherein the analyte sensor device comprises:
  a first working electrode on the in vivo portion, the first working electrode having a first sensitivity; and
  a second working electrode on the in vivo portion, the second working electrode having a second sensitivity lower than the first sensitivity.

23. The analyte device of claim 22, wherein the first working electrode has a first active region having a first quantity of a catalyst disposed thereon, and wherein the second working electrode has a second active region having a second quantity of the catalyst disposed thereon, the second active region having a surface area smaller than that of the first active region.

24. The analyte device of claim 23, wherein the instructions to generate adjusted analyte data include instructions that, when executed by the processing circuitry, cause the processing circuitry to:
  detect the first analyte signal from the first working electrode;
  detect the second analyte signal from the second working electrode;
  compute a difference between the first analyte signal and the second analyte signal; and
  compute the adjusted analyte data based on the difference between the first analyte signal and the second analyte signal.

25. The analyte device of claim 24, wherein the instructions to generate adjusted analyte data include instructions that, when executed by the processing circuitry, cause the processing circuitry to compute an individual background offset based on the first analyte signal, the second analyte signal, and the difference between the first analyte signal and the second analyte signal, wherein the offset signal is calculated based on the individual background offset.

26. The analyte device of claim 22, wherein the second working electrode is configured to measure an individual background current, and wherein the offset signal is calculated based on the individual background current.

27. The analyte device of claim 17, further comprising a temperature sensor, wherein the memory further stores instructions that, when executed by the processing circuitry, cause the processing circuitry to:
  apply a temperature correction on the first analyte signal or the second analyte signal based on a temperature from the temperature sensor of the analyte sensor device.

28. The analyte device of claim 17, wherein the in vivo portion extends from a body of the analyte sensor device, and comprises:
  a first working electrode on the in vivo portion, the first working electrode having a first sensing layer at a first position along a length of the in vivo portion; and
  a second working electrode on the in vivo portion, the second working electrode having a second sensing layer at a second position along the length of the in vivo portion, the second position being proximal to the first position.

29. The analyte device of claim 28, wherein the memory further stores instructions that, when executed by the processing circuitry, cause the processing circuitry to detect a system fault of the analyte sensor device by:
  detecting the first analyte signal from the first working electrode; and
  detecting the second analyte signal from the second working electrode.

30. The analyte device of claim 29, wherein the offset is a fixed offset based on the orthogonal fit.

31. The analyte device of claim 29, wherein the offset is a time-varying offset based on the orthogonal fit.

32. The analyte device of claim 17, further comprising detecting a system fault of the analyte sensor device when the one or more metrics of agreement exceed the threshold, wherein the system fault is late sensor attenuation (LSA).

33. An analyte sensor device that is configured to operate in a manner so as to attempt to reduce a background signal in an analyte reading of the analyte sensor device, resulting in mitigation of an erroneous detection of the analyte reading and further resulting in improved control of a drug delivery pump, said analyte sensor device comprising:
  an in vivo portion comprising:
    a first working electrode on the in vivo portion, the first working electrode having a first sensitivity;
    a second working electrode on the in vivo portion, the second working electrode having a second sensitivity lower than the first sensitivity; and
  a processor and memory coupled to the in vivo portion, the memory storing instructions that, when executed by the processor, cause the processor to:
    determine a drug dosage that is delivered to a user of the analyte sensor device via the drug delivery pump;
    deliver the drug dosage to the user via the drug delivery pump;
    measure a first analyte signal based on the first working electrode;
    measure a second analyte signal based on the second working electrode;
    compute one or more metrics of agreement between the first analyte signal and the second analyte signal;
    compare the one or more metrics of agreement against a threshold;
    in response to a determination that the one or more metrics of agreement exceed the threshold:
      compute an orthogonal fit between the first analyte signal and the second analyte signal;
      compute an offset based on the orthogonal fit;
      correct at least one of the first analyte signal and the second analyte signal based on the offset in real-time;
      generate adjusted analyte data based on the corrected analyte signal including reducing the background signal in the corrected analyte signal in real-time;
      compute an analyte value based on the adjusted analyte data; and display the analyte value on a display device; and in response to computing the analyte value, which is based on the adjusted analyte data in which the background signal is reduced, modify the drug dosage that is delivered to the user via the drug delivery pump and subsequently deliver the modified drug dosage to the user via the drug delivery pump, such that reduction of the background signal facilitates an improved accuracy of the analyte value, which is used to control the drug delivery pump.

34. The analyte sensor device of claim 33, wherein the first working electrode has a first active region having a first quantity of a catalyst disposed thereon, and wherein the second working electrode has a second active region having a second quantity of the catalyst disposed thereon, the second active region having a surface area smaller than that of the first active region.

35. The analyte sensor device of claim 33, wherein the background signal is reduced in the first analyte signal in accordance with an offset signal.

36. The analyte sensor device of claim 35, wherein the memory further stores instructions, that, when executed by the processor, cause the processor to generate adjusted analyte data by:
   subtracting the offset signal from the first analyte signal to generate an offset corrected signal;
   calculating a plurality of sensitivities from the offset corrected signal, each sensitivity corresponding to a reference point of a plurality of analyte reference points;
   computing a median of the sensitivities over a time window;
   calculating the adjusted analyte data based on the offset corrected signal and the median of the sensitivities; and
   pairing the adjusted analyte data with the reference points.

37. The analyte sensor device of claim 36, wherein the offset signal is computed from a global time-varying background offset based on an elapsed time since activation of the analyte sensor device to compute the offset corrected signal.

38. The analyte sensor device of claim 36, wherein the offset signal is a time-invariant off set.

39. The analyte sensor device of claim 36, wherein the first working electrode has a first active region having a first quantity of a catalyst disposed thereon, wherein the second working electrode has a second active region having a second quantity of the catalyst disposed thereon, the second active region having a surface area smaller than that of the first active region, and wherein the instructions to reduce the background signal comprise instructions that, when executed by the processor, cause the processor to:
   detect the first analyte signal from the first working electrode; and
   detect a second analyte signal from the second working electrode.

40. The analyte sensor device of claim 39, wherein the memory further stores instructions that, when executed by the processor, cause the processor to compute an individual background offset based on the first analyte signal, the second analyte signal, and a difference between the first analyte signal and the second analyte signal, wherein the offset signal is calculated based on the individual background offset.

41. The analyte sensor device of claim 36, wherein the memory further stores instructions that, when executed by the processor, cause the processor to compute an individual background offset based on the first analyte signal, the second analyte signal, and a difference between the first analyte signal and the second analyte signal, wherein the offset signal is calculated based on the individual background offset.

42. The analyte sensor device of claim 33, further comprising a temperature sensor, wherein the memory further stores instructions that, when executed by the processor, cause the processor to:
   apply a temperature correction on the first analyte signal or the second analyte signal based on a temperature from the temperature sensor of the analyte sensor device.

* * * * *